(12) United States Patent
Yano et al.

(10) Patent No.: US 8,853,309 B2
(45) Date of Patent: Oct. 7, 2014

(54) CURABLE COMPOSITION AND CURED PRODUCT THEREOF

(75) Inventors: Ayako Yano, Takasago (JP); Noriko Noro, Takasago (JP)

(73) Assignee: Kaneka Corporation, Osaka (JP)

( * ) Notice: Subject to any disclaimer, the term of this patent is extended or adjusted under 35 U.S.C. 154(b) by 514 days.

(21) Appl. No.: 13/121,497

(22) PCT Filed: Sep. 28, 2009

(86) PCT No.: PCT/JP2009/066733
§ 371 (c)(1), (2), (4) Date: Jun. 7, 2011

(87) PCT Pub. No.: WO2010/035820
PCT Pub. Date: Apr. 1, 2010

(65) Prior Publication Data
US 2011/0237723 A1    Sep. 29, 2011

(30) Foreign Application Priority Data

Sep. 29, 2008 (JP) .................................. 2008-250556
Mar. 12, 2009 (JP) .................................. 2009-059761

(51) Int. Cl.
| | | |
|---|---|---|
| *C08K 5/52* | (2006.01) | |
| *C08G 65/336* | (2006.01) | |
| *C09J 175/08* | (2006.01) | |
| *C08G 18/48* | (2006.01) | |
| *C08L 71/02* | (2006.01) | |
| *C08G 18/71* | (2006.01) | |
| *C09J 171/02* | (2006.01) | |
| *C09K 3/10* | (2006.01) | |
| *C08L 101/10* | (2006.01) | |
| *C08K 5/31* | (2006.01) | |
| *C08K 5/51* | (2006.01) | |

(52) U.S. Cl.
CPC ............... *C09K 3/10* (2013.01); *C08G 65/336* (2013.01); *C08L 101/10* (2013.01); *C09J 175/08* (2013.01); *C08G 18/4854* (2013.01); *C08L 71/02* (2013.01); *C08G 18/718* (2013.01); *C08G 2190/00* (2013.01); *C08K 5/31* (2013.01); *C09J 171/02* (2013.01); *C08K 5/51* (2013.01)
USPC ........................................................ 524/115

(58) Field of Classification Search
USPC ........................................................ 524/115
See application file for complete search history.

(56) References Cited

U.S. PATENT DOCUMENTS

| | | | |
|---|---|---|---|
| 4,904,732 A | 2/1990 | Iwahara et al. | |
| 2009/0182099 A1* | 7/2009 | Noro et al. | 525/474 |
| 2009/0186993 A1 | 7/2009 | Noro et al. | |
| 2010/0036049 A1 | 2/2010 | Matsushita et al. | |

FOREIGN PATENT DOCUMENTS

| | | | |
|---|---|---|---|
| CN | 101184767 A | | 5/2008 |
| EP | 1 209 190 | * | 5/2002 |
| EP | 1 990 370 A1 | | 11/2008 |
| EP | 1 992 665 A1 | | 11/2008 |
| JP | 52-073998 A | | 6/1977 |
| JP | 61-174287 A | | 8/1986 |
| JP | 63-006041 A | | 1/1988 |
| JP | 5-039428 A | | 2/1993 |
| JP | 5-117519 A | | 5/1993 |
| JP | 09-012860 A | | 1/1997 |
| JP | 2000-313814 A | | 11/2000 |
| JP | 2000-345054 A | | 12/2000 |
| JP | 2003-206410 A | | 7/2003 |
| JP | 2005-248175 A | | 9/2005 |
| JP | 2007-039568 A | | 2/2007 |
| JP | 3960650 B2 | | 8/2007 |
| WO | 2006/113122 A2 | | 10/2006 |
| WO | 2007/037485 A1 | | 4/2007 |
| WO | 2007/094274 A1 | | 8/2007 |
| WO | 2007/094275 A1 | | 8/2007 |
| WO | 2007/094276 A1 | | 8/2007 |
| WO | WO 2007 094273 | * | 8/2007 |
| WO | 2008/111598 A1 | | 9/2008 |

OTHER PUBLICATIONS

International Search Report of PCT/JP2009/066733, mailing date Dec. 22, 2009.
International Preliminary Report on Patentability (Form PCT/IB/373) of International Application No. PCT/JP2009/066733 dated May 10, 2011 with Form PCT/ISA/237.

* cited by examiner

*Primary Examiner* — Doris Lee
(74) *Attorney, Agent, or Firm* — Westerman, Hattori, Daniels & Adrian, LLP

(57) ABSTRACT

The present invention aims to provide a curable composition without adverse effects on the environment, which exhibits excellent curability without containing a toxic organotin curing catalyst, and gives a cured product that does not have discoloration and cracks on the surface thereof even after being exposed to the atmosphere and ultraviolet light for a long time. The present invention also aims to provide the cured product. The curable composition comprises: (A) an organic polymer having a reactive silyl group; (B) a guanidine compound having a specific structure; and (C) a phosphorus compound that has an aryl group, has a phosphorus atom with an oxidation number of +5, and has a melting point of 23° C. or higher.

10 Claims, 1 Drawing Sheet

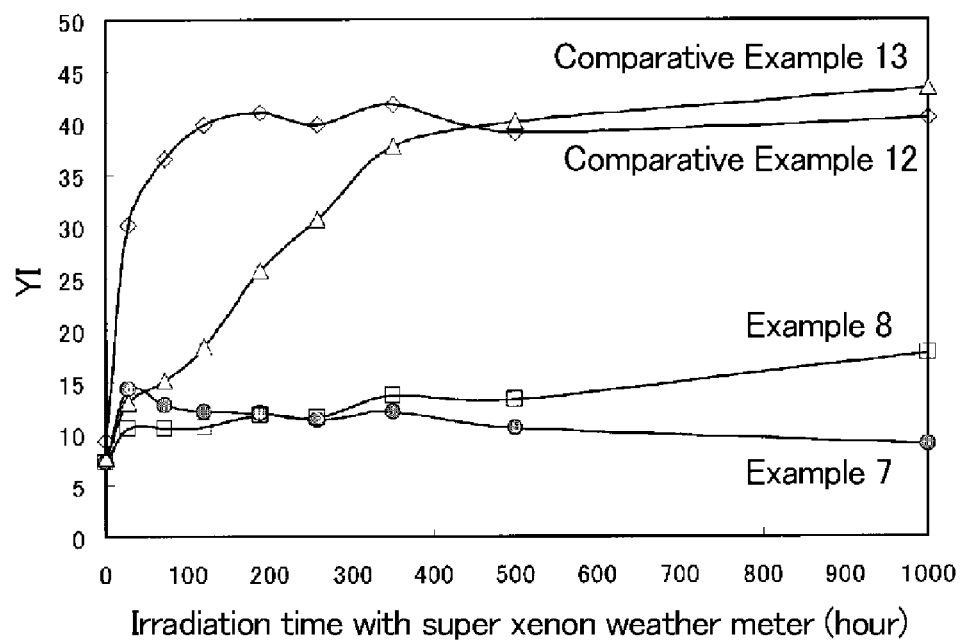

CURABLE COMPOSITION AND CURED PRODUCT THEREOF

TECHNICAL FIELD

The present invention relates to a curable composition comprising one or more organic polymers having a silicon-containing group which has a hydroxy group or hydrolyzable group bonded to a silicon atom and can form a siloxane bond to be cross-linked (hereinafter referred to also as a "reactive silyl group").

BACKGROUND ART

Organic polymers containing at least one reactive silyl group in each molecule are known to have properties such that they are cross-linked by siloxane bond formation involving reactions such as hydrolysis of the reactive silyl group due to moisture or the like even at room temperature, and thereby provide rubbery cured products.

Among these reactive silyl group-containing polymers, those polymers which have a main chain skeleton of a polyoxyalkylene polymer or a polyisobutylene polymer are disclosed in Patent Documents 1 and 2, and the like. These polymers have already been industrially produced and used in various applications such as sealants, adhesives, and coatings.

Curable compositions containing these reactive silyl group-containing organic polymers further contain a silanol condensation catalyst in order to provide cured products. Common examples of the silanol condensation catalyst include organotin catalysts having a carbon-tin bond, such as dibutyltin bis(acetylacetonate) and dibutyltin dilaurate. In recent years, however, organotin compounds are known to be toxic, and the development of non-organotin catalysts has been desired.

Patent Documents 3, 4, 5, 6, and 7 disclose tin carboxylates and other metal carboxylates as silanol condensation catalysts.

These documents also disclose that addition of an amine compound as a promoter to such catalysts improves curability. In consideration of environmental load, a curing catalyst containing substantially no metal is also desired. Patent Document 8 discloses that combination use of an amine compound and a carboxylic acid provides a metal-free silanol condensation catalyst.

As above, combination use of an amine compound and another silanol condensation catalyst is a known technique to improve curability. With this technique, however, the adhesiveness in the case of using the non-organotin catalysts disclosed by the above Patent Documents needs to be further improved compared to the case of using organotin catalysts.

There are very few documents disclosing an example that an amine compound is solely used as a silanol condensation catalyst. Although Patent Document 9 discloses a technique with use of a biguanide compound, which is one of amine compounds, as a silanol condensation catalyst, it has a problem that the curable composition may not show practical curability.

Patent Documents 10 and 11 each disclose a technique in which a highly active reactive silyl group is used in combination so that the above curability problem is solved. Further, Patent Document 12 teaches that a guanidine compound having a specific structure has specifically high catalytic activity and provides good adhesiveness. However, those biguanide compounds and guanidine compounds have a problem that the resulting cured products have yellowing on the surface after a long time or have not only discoloration but also cracks (fractures) on the surface when exposed outdoors, differently from the case of using commonly used orgarnnotin catalysts.

Meanwhile, phosphorus compounds are generally used as plasticizers, antioxidants, antifungal agents, and flame retardants for polymer materials, and are disclosed for example by Patent Document 13. Patent Document 14 discloses an antibacterial sealant composition containing a cyclic phosphate ester compound together with a reactive silyl group-containing organic polymer.

Patent Document 1: JP-A S52-73998
Patent Document 2: JP-A S63-6041
Patent Document 3: JP-A H5-39428
Patent Document 4: JP-A H9-12860
Patent Document 5: JP-A 0.2000-313814
Patent Document 6: JP-A 2000-345054
Patent Document 7: JP-A 2003-206410
Patent Document 8: JP-A H5-117519
Patent Document 9: JP-A 2005-248175
Patent Document 10: WO 2007/094274
Patent Document 11: WO 2007/094275
Patent Document 12: WO 2007/094276
Patent Document 13: JP-A S61-174287
Patent Document 14: JP-B 3960650

SUMMARY OF THE INVENTION

The present invention aims to provide a curable composition containing a reactive silyl group-containing organic polymer, which exhibits excellent curability without containing a toxic organotin curing catalyst as a silanol condensation catalyst and gives a cured product that does not have dicoloration and cracks (fractures on the surface) even after being exposed to the atmosphere and ultraviolet light for a long time. The present invention also aims to solve problems arising on the surface of the cured product and maintain good surface properties for a long time in the case that the curable composition contains a specific guanidine compound as a silanol condensation catalyst.

The present inventors have studied various compounds to solve the above problems and have found facts such as the following:

in the case that a guanidine compound having a specific structure represented by the following general formula (1) is used as a silanol condensation catalyst, its combined use with a phosphorus compound having an aryl group, a phosphorus atom with an oxidation number of +5, and a melting, point of 23° C. or higher suppresses surface yellowing and delays the onset of cracks after a weathering test, thereby improving surface weather resistance;

a larger addition amount of the phosphorus compound leads to more suppression of yellowing after a weathering test;

the combined use with the phosphorus compound does not decrease curability which is an important property of curable compositions;

a curable composition containing a phosphorus compound having trivalent phosphorus and guanidine in combination is not suitable for use because it does not have an effect of suppressing yellowing of the cured product and causes bad odor;

addition of a phosphorus compound having a melting point below 23° C. provides no discoloration improvement effect; and the use of phenylguanidine, which is a kind of guanidine, causes a problem that circular patterns will occur or small particles will be crystallized on the surface of the cured product, but combining therewith a pentavalent phosphorus compound having an aryl group and a melting point of 23° C. or higher suppresses the problem arising on the surface of the cured product and does not cause bad odor.

As a result, the present inventors have solved problems of non-organotin curing catalysts substitutable for organotin curing catalysts. Thus, the present inventors have completed the present invention.

Specifically, the present invention relates to the following (I) to (XI).

(I). A curable composition comprising:
(A) an organic polymer having a silyl group cross-linkable by siloxane bond formation;
(B) a guanidine compound represented by formula (1):

wherein each of the five $R^1$s is independently at least one selected from the group consisting of a hydrogen atom, a hydroxy group, an amino group, a nitro group, a cyano group, a sulfonic acid group, and an organic group, provided that at least one of the five $R^1$s is an aryl group; and
(C) a phosphorus compound that has an aryl group, has a phosphorus atom with an oxidation number of +5, and has a melting point of 23° C. or higher.

(II). The curable composition according to (I), wherein the phosphorus compound (C) is a phosphate ester compound.

(III). The curable composition according to (I) or (II), wherein the phosphorus compound (C) is a metal salt of a phosphate ester.

(IV). The curable composition according to any one of (I) to (III), wherein a blending amount of the phosphorus compound (C) is 2 to 20 parts by weight for each 100 parts by weight of the organic polymer (A).

(V). The curable composition according to any one of (I) to (IV), wherein the guanidine compound (B) is represented by formula (2).

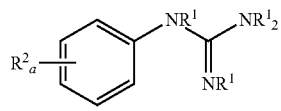

In the formula, each of the four $R^1$s is independently at least one selected from the group consisting of a hydrogen atom, a hydroxy group, an amino group, a nitro group, a cyano group, a sulfonic acid group, and an organic group; each of the a $R^2$s is at least one selected from the group consisting of a hydrogen atom, a halogen atom, a hydroxy group, an amino group, a nitro group, a cyano group, a sulfonic acid group, and an organic group; and a is an integer of 1 to 5.

(VI). The curable composition according to any one of (I) to (V), wherein the guanidine compound (B) is at least one selected from the group consisting of 1-phenylguanidine, 1-(o-tolyl)guanidine, 1-phenylbiguanide, and 1-(o-tolyl)biguanide.

(VII). The curable composition according to any one of (I) to (VI), wherein the organic polymer (A) has, as a main chain skeleton, at least one selected from the group consisting of a polyoxyalkylene polymer, a saturated hydrocarbon polymer, and a (meth)acrylate ester polymer.

(VIII). The curable composition according to (VII), wherein the polyoxyalkylene polymer is a polyoxypropylene polymer.

(IX). A sealant, comprising the curable composition according to any one of (I) to (VIII).

(X). An adhesive, comprising the curable composition according to any one of (I) to (VIII).

(XI). A cured product, which is produced from the curable composition according to any one of (I) to (VIII).

The curable composition of the present invention is excellent in environmental suitability because it is free from organotin compounds known to be toxic according to recent studies. Combination use of a specific phosphorus compound and a guanidine compound having a specific structure prevents occurrence of patterns or crystallization of small particles on the surface of a cured product of the curable composition, and discoloration of the surface after long-time storage of the product. Further, the curable composition of the present invention is effectively used as an architectural or industrial sealant, and provides a cured product that has less discoloration and less cracks on the surface thereof even when exposed outdoors for a long time and retains a fine appearance thereof for a long time.

BRIEF DESCRIPTION OF THE DRAWINGS

[FIG. 1]
FIG. 1 is a view showing levels of yellowing of the surfaces of the cured products according to Example 7, Example 8, Comparative Example 12, and Comparative Example 13.

BEST MODE FOR CARRYING OUT THE INVENTION

The following will describe the present invention in detail.

The curable composition of the present invention essentially comprises a reactive silyl group-containing organic polymer (A).

The organic polymer (A) has one or more reactive silyl groups per molecule on average. Here, the reactive silyl group is an organic group having a hydroxy group or hydrolyzable group bonded to a silicon atom. The reactive silyl group-containing organic polymer (A) forms a siloxane bond owing to a reaction accelerated by a silanol condensation catalyst and is thereby crosslinked.

Examples of the reactive silyl group include groups represented by formula (3):

wherein each of the b $R^3$s independently represents at least one selected from the group consisting of a C1-C20 alkyl group, a C6-C20 aryl group, a C7-C20 aralkyl group, and a triorganosiloxy group represented by —OSi(R')$_3$ (wherein each of the R's independently represents a C1-C20 hydrocarbon group); each of the (3-b) $X^1$s independently represents a hydroxy group or a hydrolyzable group; and b is an integer of 0 to 3.

The curable composition of the present invention mainly comprises the reactive silyl group-containing organic polymer (A) and is more compatible with the guanidine compound (B) serving as a curing catalyst in comparison with one mainly comprising an inorganic polymer such as polydimethyl siloxane, and thereby has excellent curability and adhesiveness.

For the same reason, the main chain skeleton of the organic polymer (A) is preferably composed of at least one selected from a hydrogen atom, a carbon atom, a nitrogen atom, an oxygen atom, and a sulfur atom.

The main chain skeleton of the organic polymer (A) is not particularly limited, and examples thereof include: polyoxyalkylene polymers such as polyoxyethylene, polyoxypropylene, polyoxybutylene, polyoxytetramethylene, polyoxyethylene-polyoxypropylene copolymers, and polyoxypropylene-polyoxybutylene copolymers; hydrocarbon polymers such as ethylene-propylene copolymers, polyisobutylene, copolymers of isobutylene and isoprene or a like monomer, polychloroprene, polyisoprene, copolymers of isoprene or butadiene with acrylonitrile and/or styrene or a like monomer, polybutadiene, and copolymers of isoprene or butadiene with acrylonitrile and styrene or a like monomer, and hydrogenated polyolefin polymers derived from hydrogenation of these polyolefin polymers; polyester polymers produced by condensation of a dibasic acid such as adipic acid and a glycol, and produced by ring-opening polymerization of lactones; (meth)acrylate ester polymers produced by radical polymerization of compounds such as ethyl (meth)acrylate and butyl (meth)acrylate; vinyl polymers produced by radical polymerization of compounds such as (meth)acrylate ester compounds, vinyl acetate, acrylonitrile, and styrene; graft polymers produced by polymerizing a vinyl compound in any of the polymers mentioned above; polysulfide polymers; polyamide polymers such as polyamide 6 produced by ring-opening polymerization of $\epsilon$-caprolactam, polyamide 6/6 produced by polycondensation of hexamethylenediamine and adipic acid, polyamide 6/10 produced by polycondensation of hexamethylenediamine and sebacic acid, polyamide 11 produced by polycondensation of $\epsilon$-aminoundecanoic acid, polyamide 12 produced by ring-opening polymerization of $\epsilon$-aminolaurolactam, and copolymer polyamides containing multiple species of the aforementioned polyamides; polycarbonate polymers such as polycarbonates produced by polycondensation of bisphenol A and carbonyl chloride; diallyl phthalate polymers; and other organic polymers.

Preferable among these are saturated hydrocarbon polymers such as polyisobutylene, hydrogenated polyisoprene, and hydrogenated polybutadiene; polyoxyalkylene polymers; and (meth)acrylate ester polymers. This is because the organic polymer (A) having such a main chain skeleton has a relatively low glass transition temperature and the cured product to be provided is allowed to have excellent cold resistance.

The glass transition temperature of the reactive silyl group-containing organic polymer (A) is not particularly limited. It is preferably 20° C. or lower, more preferably 0° C. or lower, and particularly preferably −20° C. or lower. If the glass transition temperature is higher than 20° C., the curable composition may have a high viscosity in winter or in cold districts, and thus the workability is likely to be poor. In addition, the cured product to be provided is likely to have deteriorated flexibility and thus have poor elongation.

The glass transition temperature may be determined by the DSC measurement in accordance with the method in JIS K 7121.

A curable composition mainly comprising an organic polymer whose main chain skeleton is a saturated hydrocarbon polymer, a polyoxyalkylene polymer, or a (meth)acrylate ester polymer is more preferable because when the curable composition is used as an adhesive or sealant, low-molecular-weight components are less likely to transfer to (i.e. stain) adherends.

An organic polymer whose main chain skeleton is a polyoxyalkylene polymer or a (meth)acrylate ester polymer is particularly preferable because such an organic polymer has high moisture permeability, and is excellent in depth curability and provides a cured product excellent in adhesiveness when used as a main component of a one-pack type adhesive or sealant. Most preferable is an organic polymer whose main chain skeleton is a polyoxyalkylene polymer.

The polyoxyalkylene polymer to be used as the main chain skeleton of the organic polymer (A) is a polymer having a repeating unit represented by formula (4):

$$—R^4—O—\qquad(4)$$

wherein $R^4$ is a C1-C14 linear or branched alkylene group.

$R^4$ in formula (4) is not particularly limited as long as it is a C1-C14 linear or branched alkylene group. In particular, a C2-C4 linear or branched alkylene group is preferable.

The repeating unit defined by formula (4) is not particularly limited. Examples thereof include: $—CH_2O—$, $—CH_2CH_2O—$, $—CH_2CH(CH_3)O—$, $—CH_2CH(C_2H_5)O—$, $—CH_2C(CH_3)_2O—$, and $—CH_2CH_2CH_2CH_2O—$.

The polyoxyalkylene polymer may have one repeating unit or multiple repeating units. In applications such as sealants, in particular, the organic polymer (A) preferably mainly contains a propylene oxide polymer as the main chain skeleton because such an organic polymer (A) is noncrystalline and has a relatively low viscosity.

The polyoxyalkylene polymer may be produced by any method including conventionally known methods. Examples thereof include: a method with an alkali catalyst such as KOH; a method in which a transition metal compound-porphyrin complex, such as a complex produced by the reaction between an organoaluminum compound and porphyrin, is used as a catalyst, as disclosed in JP-A S61-215623; methods in which a double metal cyanide complex is used as a catalyst, as disclosed in JP-B S46-27250, JP-B S59-15336, U.S. Pat. Nos. 3,278,457, 3,278,458, 3,278,459, 3,427,256, 3,427,334, 3,427,335 and other documents; a method in which a polyphosphazene salt is used as a catalyst, as disclosed in JP-A H10-273512; and a method in which a phosphazene compound is used as a catalyst, as disclosed in JP-A H11-060722.

A reactive silyl group-containing polyoxyalkylene polymer may be produced by any method including conventionally known methods. Examples thereof include: methods disclosed in JP-B S45-36319, JP-B S46-12154, JP-A S50-156599, JP-A S54-6096, JP-A S55-13767, JP-A S55-13468, JP-A S57-164123, JP-B H03-2450, U.S. Pat. Nos. 3,632,557, 4,345,053, 4,366,307, 4,960,844 and other documents; and methods providing a polymer with a high molecular weight (number-average molecular weight of 6,000 or higher) and a narrow molecular weight distribution (Mw/Mn of 1.6 or below) as disclosed in JP-A S61-197631, JP-A S61-215622, JP-A S61-215623, JP-A S61-218632, JP-A H03-72527, JP-A H03-47825, JP-A H08-231707 and other documents.

Reactive silyl group-containing polyoxyalkylene polymers may be added alone or may be added in combination to the curable composition.

The saturated hydrocarbon polymer to be used as the main chain skeleton of the organic polymer (A) is a polymer that is substantially free from any carbon-carbon unsaturated bond except an aromatic ring in each molecule. Such a polymer is excellent in heat resistance, weather resistance, durability, and moisture barrier property.

The saturated hydrocarbon polymer is not particularly limited. Examples thereof include: (i) polymers comprising a C2-C6 olefin compound, such as ethylene, propylene, 1-butene, or isobutylene, as a repeating unit; (ii) polymers comprising a diene compound, such as butadiene or isoprene, as a repeating unit; and (iii) polymers produced for example by copolymerization of the aforementioned diene compound and olefin compound, and then hydrogenation of the produced copolymer. In particular, isobutylene polymers and hydrogenated polybutadiene polymers are preferable because, for example, functional groups are easily introduced into the ends of these polymers, their molecular weights are easily controlled, and the number of terminal functional groups can be adjusted. More preferable are isobutylene polymers.

The isobutylene polymers may be ones in which all of the repeating units are derived from isobutylene or may be copolymers of isobutylene with other compounds. In the case that an isobutylene copolymer is used as the main chain skeleton, the polymer preferably has 50% by weight or more, more preferably 80% by weight or more, and particularly preferably 90 to 99% by weight, of an isobutylene-derived repeating unit per molecule because the cured product to be provided has excellent rubber properties.

The saturated hydrocarbon polymer may be produced by any method including conventionally known polymerization methods. Particularly preferable is the living polymerization method which has been remarkably developed in recent years. Examples of the method for producing an isobutylene polymer by the living polymerization include the inifer polymerization found by Kennedy et al. (J. P. Kennedy et al., J. Polymer Sci., Polymer Chem. Ed., 1997, vol. 15, p. 2843).

This polymerization method is known to enable introduction of various functional groups into molecular ends and provide isobutylene polymers having a molecular weight of about 500 to 100,000 with a molecular weight distribution of not broader than 1.5.

A reactive silyl group-containing saturated hydrocarbon polymer may be produced by any method including conventionally known methods. Examples thereof include methods disclosed in JP-B H04-69659, JP-B H07-108928, JP-A S63-254149, JP-A S64-22904, JP-A H01-197509, JP-B 2539445, JP-B 2873395, JP-A H07-53882 and other documents.

The reactive silyl group-containing saturated hydrocarbon polymers may be added alone, or may be added in combination to the curable composition.

The (meth)acrylate ester polymer to be used as the main chain skeleton of the organic polymer (A) is a polymer comprising a (meth)acrylate compound as a repeating unit. The term "(meth)acrylate" herein refers to an acrylic acid ester and/or a methacrylic acid ester, and has the same meaning also in the following description.

The (meth)acrylate compound to be used as a repeating unit is not particularly limited. Examples thereof include: (meth)acrylic acid compounds such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluoyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, γ-(methacryloyloxy)propyltrimethoxysilane, γ-(methacryloyloxy)propyldimethoxymethylsilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethyl)methyl (meth)acrylate, 2-trifluoromethyl-2-perfluoroethylethyl (meth)acrylate, 2-perfluorohexylethyl (meth)acrylate, 2-perfluorodecylethyl (meth)acrylate, and 2-perfluorohexadecylethyl (meth)acrylate.

The (meth)acrylate ester polymers include copolymers of a (meth)acrylate compound and a vinyl compound copolymerizable therewith.

The vinyl compound is not particularly limited. Examples thereof include: styrene compounds such as styrene, vinyltoluene, α-methylstyrene, chlorostyrene, and styrenesulfonic acid and salts thereof; silyl group-containing vinyl compounds such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide compounds such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl compounds such as acrylonitrile and methacrylonitrile; amide group-containing vinyl compounds such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, allyl alcohol, and the like. Two or more of these may be used in combination as comonomers.

Preferable among the (meth)acrylate ester polymers produced from the aforementioned compounds are organic polymers comprising, as the main chain skeleton, a copolymer of a styrene compound and a (meth)acrylate compound because the curable composition containing such an organic polymer provides a cured product having excellent physical properties; more preferable are organic polymers comprising, as the main chain skeleton, a copolymer of an acrylate compound and a methacrylate compound; and particularly preferable are organic polymers comprising, as the main chain skeleton, a polymer of an acrylate compound.

For applications such as general architectural applications, the curable composition is required to have a low viscosity, and the cured product to be provided therefrom is required to have a low modulus, high elongation, high weather resistance, and high heat resistance, in particular.

In order to satisfy these requirements, the main chain skeleton of the organic polymer (A) more preferably comprises a polymer derived from a butyl acrylate compound.

For applications such as automobile applications, the cured product to be provided is required to be excellent in properties such as oil resistance.

In order to provide the cured product having excellent oil resistance, the main chain skeleton of the organic polymer (A) more preferably comprises a copolymer mainly derived from ethyl acrylate.

In the case that the curable composition comprises the organic polymer (A) comprising, as the main chain skeleton, such a copolymer mainly derived from ethyl acrylate, the cured product to be provided is likely to have slightly poor low-temperature properties (cold resistance) while having excellent oil resistance. In order to improve the low-temperature properties, some ethyl acrylate monomers may be replaced with butyl acrylate monomers. As the proportion of butyl acrylate is increased, however, the good oil resistance is likely to be impaired. Thus, the proportion thereof is preferably 40% or lower, and more preferably 30% or lower, in the applications requiring good oil resistance.

In order to improve properties such as the low-temperature properties without impairment of the oil resistance, it is also preferable to use, as a comonomer, a compound such as 2-methoxyethyl acrylate or 2-ethoxyethyl acrylate in which an oxygen atom is introduced in the side chain alkyl group.

Here, the cured product to be provided is likely to have poor heat resistance due to introduction of an alkoxy group having an ether bond in the side chain. Thus, the proportion of such a compound is preferably 40% or lower in the applications requiring good heat resistance.

As mentioned above, the organic polymer (A) comprising, as the main chain skeleton, a copolymer mainly derived from ethyl acrylate can be optimized by appropriately selecting comonomers and adjusting the proportion thereof in consideration of physical properties required for the cured product to be provided, such as oil resistance, heat resistance, and low-temperature properties, according to various uses and requirements. For example, without any limitative meaning, copolymers of ethyl acrylate, butyl acrylate, and 2-methoxyethyl acrylate (weight ratio: 40-50/20-30/30-20) have an excellent balance of physical properties including oil resistance, heat resistance, and low-temperature properties.

In the present invention, these preferable compounds may be copolymerized or even block-copolymerized with another compound. In such a case, a copolymer to be produced preferably contains these preferable compounds in an amount of 40% by weight or more.

The (meth)acrylate ester polymer may be produced by any method including conventionally known methods. Particularly preferable is the living radical polymerization because this method enables cross-linkable functional groups to be easily introduced in a high proportion into molecular chain ends and provides a polymer having a narrow molecular weight distribution and a low viscosity.

Here, ordinary free radical polymerization, in which a compound such as an azo compound or a peroxide is used as a polymerization initiator, is likely to provide a polymer generally having a molecular weight distribution value as high as not lower than 2 and a higher viscosity.

More preferable for producing a (meth)acrylate ester polymer containing a specific functional group among the methods for producing (meth)acrylate ester polymers by the aforementioned "living radical polymerization" is the "atom transfer radical polymerization" in which a substance such as an organic halide or sulfonyl halide compound is used as an initiator and a transition metal complex is used as a catalyst. One reason for this is that the atom transfer radical polymerization has the features of the "living radical polymerization", that is, providing a polymer with a narrow molecular weight distribution and a low viscosity. Other reasons include that the atom transfer radical polymerization gives a high degree of freedom in selecting an initiator and a catalyst, and provides a polymer terminally having a halogen or the like group which is relatively advantageous to functional-group exchange reactions. Examples of the atom transfer radical polymerization include the method described in Matyjaszewski et al., Journal of the American Chemical Society (J. Am. Chem. Soc.), 1995, vol. 117, p. 5614.

A reactive silyl group-containing (meth)acrylate ester polymer may be produced by any method. Examples thereof include the free radical polymerization with a chain transfer agent, as disclosed in JP-B H03-14068, JP-B H04-55444, JP-A H06-211922, and other documents; and the atom transfer radical polymerization as disclosed in JP-A H09-272714 and other documents.

A (meth)acrylate copolymer derived from multiple species of the aforementioned (meth)acrylate compounds may be used as the main chain skeleton of the organic polymer (A).

Specific examples of the (meth)acrylate copolymer derived from multiple species of the (meth)acrylate compounds include copolymers whose main chain skeleton substantially comprises:

a repeating unit having a C1-C8 alkyl group represented by formula (5):

$$—CH_2—C(R^5)(COOR^6)— \qquad (5)$$

wherein $R^5$ is a hydrogen atom or a methyl group, and $R^6$ is a C1-C8 alkyl group; and a repeating unit having an alkyl group containing 9 or more carbon atoms represented by formula (6):

$$—CH_2—C(R^5)(COOR^7)— \qquad (6)$$

wherein $R^5$ is as defined in formula (5), and $R^7$ is an alkyl group containing 9 or more carbon atoms.

$R^6$ in formula (5) is not particularly limited as long as it is a C1-C8 alkyl group. Examples thereof include a methyl group, an ethyl group, a propyl group, an n-butyl group, a t-butyl group, and a 2-ethylhexyl group. Preferable among these are C1-C4 alkyl groups, and more preferable are C1 and C2 alkyl groups. $R^6$ in the copolymer is not necessarily limited to one alkyl group species.

$R^7$ in formula (6) is not particularly limited as long as it is an alkyl group containing 9 or more carbon atoms. Examples thereof include a lauryl group, a tridecyl group, a cetyl group, a stearyl group, and a behenyl group. Preferable among these are C10-C30 alkyl groups and more preferable are C10-C20 long-chain alkyl groups. $R^7$ in the copolymer is not necessarily limited to one alkyl group species.

The (meth)acrylate copolymer substantially comprises the repeating units defined by formulas (5) and (6). The term "substantially" herein means that the total amount of the repeating units defined by formulas (5) and (6) in the copolymer is more than 50% by weight. The total amount of the repeating units defined by formulas (5) and (6) in the copolymer is preferably 70% by weight or more.

The ratio between the repeating units of formulas (5) and (6) in the copolymer is preferably 95:5 to 40:60, and more preferably 90:10 to 60:40 in terms of the weight ratio (formula (5):formula (6)).

The (meth)acrylate copolymers include copolymers of (meth)acrylate compounds used as the repeating units defined by formulas (5) and (6) and a vinyl compound copolymerizable therewith.

Examples of the vinyl compound include: acrylic acids such as acrylic acid and methacrylic acid; amide group-containing compounds such as acrylamide, methacrylamide, N-methylolacrylamide, and N-methylolmethacrylamide; epoxy group-containing compounds such as glycidyl acrylate and glycidyl methacrylate; amino group-containing compounds such as diethylaminoethyl acrylate, diethylaminoethyl methacrylate, and aminoethyl vinyl ether; and other compounds such as acrylonitrile, styrene, α-methylstyrene, alkyl vinyl ethers, vinyl chloride, vinyl acetate, vinyl propionate, and ethylene.

The main chain skeleton of the organic polymer (A) may contain, if necessary, another repeating unit having, for example, a urethane bond as long as the effects of the present invention are not significantly lessened thereby.

The urethane bond-containing repeating unit is not particularly limited. Examples thereof include a repeating unit having a group formed by the reaction between an isocyanate group and an active hydrogen group (hereinafter, the group thus formed is also referred to as an "amide segment").

The amide segment is an organic group represented by formula (7):

$$—NR^8—C(=O)— \quad (7)$$

wherein $R^8$ is a hydrogen atom or an organic group.

The amide segment is not particularly limited. Examples thereof include: a urethane group formed by reaction between an isocyanate group and a hydroxy group; a urea group formed by reaction between an isocyanate group and an amino group; and a thiourethane group formed by reaction between an isocyanate group and a mercapto group.

The definition of the "amide segment" herein also includes organic groups formed by the reactions of active hydrogen in a urethane group, a urea group, and a thiourethane group with isocyanate groups.

The reactive silyl group-containing organic polymer having an amide segment in the main chain skeleton may be produced by any method. Examples thereof include a method comprising the steps of: reacting an organic polymer having an active hydrogen-containing organic group at an end thereof with an excessive amount of a polyisocyanate compound to provide a polymer having an isocyanate group at a polyurethane main chain end; and, thereafter or simultaneously therewith, reacting all or part of the isocyanate groups in the polymer with a group W in a silicon compound represented by formula (8):

$$W—R^9—SiR^{10}_{3-c}X^2_c \quad (8)$$

wherein $R^9$ is a bivalent organic group, and more preferably a C1-C20 bivalent hydrocarbon group; each of the (3-c) $R^{10}$s is a hydrogen atom or an organic group; each of the c $X^2$s is a hydroxy group or a hydrolyzable group; c is an integer of 1, 2, or 3; and W is a group containing at least one active hydrogen selected from the group consisting of a hydroxy group, a carboxyl group, a mercapto group, and a (primary or secondary) amino group. Such a method is disclosed in Patent Documents such as JP-B S46-12154 (U.S. Pat. No. 3,632,557), JP-A S58-109529 (U.S. Pat. No. 4,374,237), JP-A S62-13430 (U.S. Pat. No. 4,645,816), JP-A H08-53528 (EP 0676403), JP-A H10-204144 (EP 0831108), JP-T 2003-508561 (U.S. Pat. No. 6,197,912), JP-A H06-211879 (U.S. Pat. No. 5,364,955), JP-A H10-53637 (U.S. Pat. No. 5,756,751), JP-A H11-100427, JP-A 2000-169544, JP-A 2000-169545, JP-A 2002-212415, JP-B 3313360, U.S. Pat. No. 4,067,844, U.S. Pat. No. 3,711,445, and JP-A 2001-323040.

In addition, examples thereof further include a method comprising the step of reacting an active hydrogen-containing group at an end of the organic polymer with an isocyanate group of a reactive silyl group-containing isocyanate compound represented by formula (9):

$$O=C=N—R^9—SiR^{10}_{3-c}X^2_c \quad (9)$$

wherein $R^9$, $R^{10}$, $X^2$, and c are as defined in formula (8). Such a method is disclosed in Patent Documents such as JP-A H11-279249 (U.S. Pat. No. 5,990,257), JP-A 2000-119365 (U.S. Pat. No. 6,046,270), JP-A S58-29818 (U.S. Pat. No. 4,345,053), JP-A H03-47825 (U.S. Pat. No. 5,068,304), JP-A H11-60724, JP-A 2002-155145, JP-A 2002-249538, WO 03/018658, and WO 03/059981.

The organic polymer having an active hydrogen-containing group at an end thereof is not particularly limited. Examples thereof include hydroxy-terminated oxyalkylene polymers (polyether polyols), polyacrylic polyols, polyester polyols, hydroxy-terminated saturated hydrocarbon polymers (polyolefin polyols), polythiol compounds, and polyamine compounds.

In particular, organic polymers comprising a polyether polyol, a polyacrylic polyol, or a polyolefin polyol in the main chain skeleton are preferable because such polymers have a relatively low glass transition temperature and provide a cured product having excellent cold resistance.

Particularly preferable are organic polymers containing a polyether polyol because they have a low viscosity and good workability, and provide a cured product having good depth curability and adhesiveness. Also, the curable composition more preferably comprises an organic polymer containing a polyacrylic polyol or a saturated hydrocarbon polymer because such a curable composition provides a cured product having good weather resistance and heat resistance.

The polyether polyol preferably has at least 0.7 terminal hydroxy groups per molecule on average.

The production method thereof is not particularly limited and may be any conventionally known method. Examples thereof include: polymerization with an alkali metal catalyst; and polymerization of an alkylene oxide in which a polyhydroxy compound having at least two hydroxy groups per molecule is used as an initiator in the presence of a double metal cyanide complex or cesium.

Preferable among the aforementioned polymerization methods is the polymerization with a double metal cyanide complex because it provides a polymer having a low degree of unsaturation, a narrow molecular weight distribution (Mw/Mn), and a low viscosity, and the cured product to be provided is allowed to have excellent acid resistance and weather resistance.

The term "polyacrylic polyol" refers to a polyol containing a (meth)acrylic acid alkyl ester (co)polymer as the skeleton thereof and having a hydroxy group in the molecule.

The production method thereof is preferably the living radical polymerization, and more preferably the atom transfer radical polymerization because such methods provide polymers having a narrow molecular weight distribution and a low viscosity. Also preferable is polymerization by the so-called SGO process in which an acrylic acid alkyl ester compound is continuously bulk-polymerized under high-temperature and high-pressure conditions, as disclosed in JP-A 2001-207157. Examples of the polyacrylic polyol include ARUFON UH-2000 produced by Toagosei Co., Ltd.

The polyisocyanate compound is not particularly limited. Examples thereof include: aromatic polyisocyanates such as toluene(tolylene)diisocyanate, diphenylmethane diisocyanate, and xylylene diisocyanate; and aliphatic polyisocyanates such as isophorone diisocyanate and hexamethylene diisocyanate.

The silicon compound of formula (8) is not particularly limited. Examples thereof include: amino group-containing silane compounds such as γ-aminopropyltrimethoxysilane, N-(β-aminoethyl)-γ-aminopropyltrimethoxysilane, (N-phenyl)-γ-aminopropyltrimethoxysilane, N-ethylaminoisobutyltrimethoxysilane, N-cyclohexylaminomethyltriethoxysilane, N-cyclohexylaminomethyldiethoxymethylsilane, and N-phenylaminomethyltrimethoxysilane; hydroxy group-containing silane compounds such as γ-hydroxypropyltrimethoxysilane; and mercapto group-containing silane compounds such as γ-mercaptopropyltrimethoxysilane.

Examples of the silicon compound of formula (8) further include Michael addition products derived from various α,β-unsaturated carbonyl compounds and primary amino group-containing silane compounds, and Michael addition products derived from various (meth)acryloyl group-containing silane compounds and primary amino group-containing compounds. Such products are disclosed in JP-A H06-211879 (U.S. Pat. No. 5,364,955), JP-A H10-53637 (U.S. Pat. No.

5,756,751), JP-A H10-204144 (EP 0831108), JP-A 2000-169544, and JP-A 2000-169545.

The reactive silyl group-containing isocyanate compound of formula (9) is not particularly limited. Examples thereof include: γ-trimethoxysilylpropyl isocyanate, γ-triethoxysilylpropyl isocyanate, γ-methyldimethoxysilylpropyl isocyanate, γ-methyldiethoxysilylpropyl isocyanate, trimethoxysilylmethyl isocyanate, triethoxymethylsilylmethyl isocyanate, dimethoxymethylsilylmethyl isocyanate, and diethoxymethylsilylmethyl isocyanate.

Examples of the reactive silyl group-containing isocyanate compound of formula (9) further include reaction products derived from the silicon compound of formula (8) and an excessive amount of a polyisocyanate compound, as disclosed in JP-A 2000-119365 (U.S. Pat. No. 6,046,270).

The hydrolyzable group represented by $X^1$ in formula (3) is not particularly limited, and may be any conventionally known hydrolyzable group. Examples thereof include a hydrogen atom, a halogen atom, an alkoxy group, an acyloxy group, a ketoxymate group, an amino group, an amide group, an acid amide group, an aminooxy group, a mercapto group, and an alkenyloxy group. Preferable among these are a hydrogen atom, an alkoxy group, an acyloxy group, a ketoxymate group, an amino group, an amide group, an aminooxy group, a mercapto group, and an alkenyloxy group. More preferable is an alkoxy group because it contributes to mild hydrolysis and is easy to handle.

One silicon atom can have one to three groups selected from a hydrolyzable group or a hydroxy group bonded thereto. In the case that two or more groups selected from a hydrolyzable group or a hydroxy group are bonded to a silicon atom in the reactive silyl group, these groups may be the same as or different from each other.

$R^3$ in formula (3) is not particularly limited. Examples thereof include: alkyl groups such as a methyl group and an ethyl group; cycloalkyl groups such as a cyclohexyl group; aryl groups such as a phenyl group; and aralkyl groups such as a benzyl group. Preferable among these is a methyl group.

The reactive silyl group of formula (3) is not particularly limited. Examples thereof include a trimethoxysilyl group, a triethoxysilyl group, a triisopropoxysilyl group, a dimethoxymethylsilyl group, a diethoxymethylsilyl group, a diisopropoxymethylsilyl group, a methoxydimethylsilyl group, and an ethoxydimethylsilyl group. Preferable among these are a trimethoxysilyl group, a triethoxysilyl group, and a dimethoxymethylsilyl group, and more preferable is a trimethoxysilyl group because such groups have high activity and contribute to good curability.

A dimethoxymethylsilyl group is particularly preferable in that it gives good curability and storage stability to the curable composition. A triethoxysilyl group is particularly preferable in that an alcohol produced through hydrolysis of the reactive silyl group in this case is ethanol which is a highly safe alcohol.

The reactive silyl group may be introduced by any method including conventionally known methods. Examples thereof include the following methods (i) to (iii).

(i) A polymer having a functional group such as a hydroxy group in each molecule is allowed to react with an organic compound having an unsaturated group and an active group that is reactive with the functional group to provide an unsaturated group-containing polymer. Alternatively, the functional group-containing polymer is allowed to copolymerize with an unsaturated group-containing epoxy compound to provide an unsaturated group-containing polymer. Then, the reaction product is allowed to react with a reactive silyl group-containing hydrosilane for hydrosilylation.

(ii) The unsaturated group-containing organic polymer provided through the same manner as in the method (i) is allowed to react with a compound having a mercapto group and a reactive silyl group.

(iii) An organic polymer having a functional group such as a hydroxy group, an epoxy group or an isocyanate group in each molecule is allowed to react with a compound having a reactive silyl group and a functional group that is reactive with the former functional group.

Preferable among these is the method (i) or the method (iii) in such a mode that a hydroxy-terminated polymer is allowed to react with a compound having an isocyanate group and a reactive silyl group because such methods achieve a high conversion rate in a relatively short period of time. More preferable is the method (i). This is because the curable composition mainly comprising the reactive silyl group-containing organic polymer produced by the method (i) is likely to have a lower viscosity than the curable composition mainly comprising the organic polymer produced by the method (iii), and thus has better workability; and the organic polymer produced by the method (ii) has a stronger odor due to mercaptosilane than the organic polymer produced by the method (i).

The hydrosilane compound to be used in the method (i) is not particularly limited. Examples thereof include: halogenated hydrosilanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, phenyldimethoxysilane, and 1-[2-(trimethoxysilyl)ethyl]-1,1,3,3-tetramethyldisiloxane; acyloxyhydrosilanes such as methyldiacetoxysilane and phenyldiacetoxysilane; and ketoxymatehydrosilanes such as bis(dimethylketoxymate)methylsilane and bis(cyclohexylketoxymate)methylsilane. In particular, halogenated hydrosilanes and alkoxyhydrosilanes are preferable. More preferable are alkoxyhydrosilanes because the curable composition mainly comprising the organic polymer (A) to be provided therefrom is mildly hydrolyzed and is easy to handle. Preferable among the alkoxyhydrosilanes is methyldimethoxysilane because it is easily available and gives excellent properties (such as curability, storage stability, elongation property, and tensile strength) to the curable composition mainly comprising the organic polymer (A) to be provided and its cured product.

The synthesis method (ii) is not particularly limited. Examples thereof include a method in which a mercapto group- and reactive silyl group-containing compound is introduced into an unsaturated-bond moiety of the organic polymer by radical addition reaction in the presence of a radical initiator and/or a radical generation source. The mercapto group- and reactive silyl group-containing compound is not particularly limited. Examples thereof include γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane, and mercaptomethyltriethoxysilane.

The synthesis method (iii) in which a hydroxy-terminated polymer is allowed to react with an isocyanate group- and reactive silyl group-containing compound is not particularly limited. Examples thereof include a method disclosed in JP-A H03-47825. The isocyanate group- and reactive silyl group-containing compound is not particularly limited. Examples thereof include: γ-isocyanatopropyltrimethoxysilane, γ-isocyanatopropylmethyldimethoxysilane, γ-isocyanatopropyltriethoxysilane, γ-isocyanatopropylmethyldiethoxysilane, isocyanatomethyltrimethoxysilane, isocyanatomethyltriethoxysilane, isocyanatomethyldimethoxymethylsilane, and isocyanatomethyldiethoxymethylsilane.

In the case of a silane compound in which three hydrolyzable groups are bonded to one silicon atom, such as trimethoxysilane, disproportionation may rapidly proceed in some cases. As the disproportionation proceeds, dangerous compounds such as dimethoxysilane may be generated.

In the case of γ-mercaptopropyltrimethoxysilane and γ-isocyanatopropyltrimethoxysilane, however, such disproportionation will not proceed. Thus, the synthesis method (ii) or (iii) is preferable in the case that a group in which three hydrolyzable groups are bonded to one silicon atom, such as a trimethoxysilyl group, is used as the silyl group.

The disproportionation will not proceed in the case of a silane compound represented by formula (10):

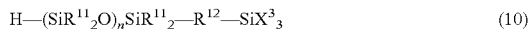

$$H-(SiR^{11}_2O)_n SiR^{11}_2-R^{12}-SiX^3_3 \quad (10)$$

wherein each of the three $X^3$s is independently a hydroxy group or a hydrolyzable group; each of the (2n+2) $R^{11}$s is independently a hydrocarbon group; $R^{12}$ is a bivalent organic group; and n is an integer of 0 to 19. Thus, the silane compound represented by formula (10) is preferably used in the case of introducing a group in which three hydrolyzable groups are bonded to one silicon atom by the synthesis method (i).

$R^{11}$ in formula (10) is not particularly limited as long as it is a hydrocarbon group. In particular, C1-C20, hydrocarbon groups are preferable, C1-C8 hydrocarbon groups are more preferable, and C1-C4 hydrocarbon groups are particularly preferable for easy availability and low cost.

$R^{12}$ in formula (10) is not particularly limited as long as it is a bivalent organic group. In particular, C1-C12 bivalent hydrocarbon groups are preferable, C2-C8 bivalent hydrocarbon groups are more preferable, and C2 bivalent hydrocarbon groups are particularly preferable for easy availability and low cost.

The symbol n in formula (10) is an integer of 0 to 19, and in particular is preferably 1 for easy availability and low cost.

Examples of the silane compound represented by formula (10) include 1-[2-(trimethoxysilyl)ethyl]-1,1,3,3-tetramethyldisiloxane, 1-[2-(trimethoxysilyl)propyl]-1,1,3,3-tetramethyldisiloxane, and 1-[2-(trimethoxysilyl)hexyl]-1,1,3,3-tetramethyldisiloxane.

The reactive silyl group-containing organic polymer (A) may have a linear or branched structure in a molecule. The number-average molecular weight thereof is preferably 500 to 100,000, more preferably 1,000 to 50,000, and particularly preferably 3,000 to 30,000 as determined by GPC and expressed on the polystyrene equivalent basis. If the number-average molecular weight is lower than 500, the cured product to be provided is likely to be poor in elongation property. If it is higher than 100,000, the curable composition to be provided is likely to have a high viscosity and be poor in workability.

The organic polymer (A) preferably has one or more reactive silyl groups, and more preferably has 1.1 to 5 reactive silyl groups per molecule on average. If the organic polymer (A) has less than one reactive silyl group per molecule on average, the curable composition is likely to have poor curability, and the cured product to be provided is less likely to show a good rubber elastic behavior.

The reactive silyl group may be located at a main chain end or at a side chain end, or at both ends. Particularly in the case that the reactive silyl group is located only at a main chain end, the organic polymer component in the cured product to be provided has an increased effective network size. Thus, a rubber-like cured product having high strength, high elongation, and low elastic modulus is likely to be provided.

The curable composition of the present invention comprises a guanidine compound (B) represented by the following formula (1) as a curing catalyst for the reactive silyl group-containing organic polymer (A). Such a curing catalyst gives excellent curability, adhesiveness, and mechanical strength to the curable composition even though it is a non-organotin catalyst, which is part of the object of the present invention.

Formula (1):

$$R^1N=C(NR^1_2)_2 \quad (1)$$

wherein each of the five $R^1$s is independently at least one selected from the group consisting of a hydrogen atom, a hydroxy group, an amino group, a nitro group, a cyano group, a sulfonic acid group, and an organic group, provided that at least one of the five $R^1$s is an aryl group.

Each of the five $R^1$s in formula (1) is a hydrogen atom, a hydroxy group, an amino group, a nitro group, a cyano group, a sulfonic acid group, or an organic group. In the case that any one of the $R^1$s is an organic group, examples of the organic group include, but are not particularly limited to, saturated or unsaturated hydrocarbon groups; organic groups in which at least one hydrogen atom in a hydrocarbon group is substituted by a functional group having at least one selected from a nitrogen atom, an oxygen atom, and a sulfur atom; and groups such as an alkoxy group, a carboxy group, an acyl group, a carbonyl group, an imino group, and a sulfonyl group.

Here, at least one of the five $R^1$s in formula (1) is required to be an aryl group in order to produce a curable composition having good curability and providing a cured product that has high strength and is not sticky on the surface.

The aryl group is not particularly limited. Examples thereof include: a phenyl group, a 2-methylphenyl group, a 3-methylphenyl group, a 4-methylphenyl group, a 2,4-dimethylphenyl group, a 2,6-dimethylphenyl group, a 2,4,6-trimethylphenyl group, a 2-chlorophenyl group, a 3-chlorophenyl group, a 2,4-dichlorophenyl group, a 2,6-dichlorophenyl group, a 2-hydroxyphenyl group, a 4-hydroxyphenyl group, a 2-aminophenyl group, a 4-aminophenyl group, a 2,4-diaminophenyl group, a 4-(dimethylamino)phenyl group, a 4-nitrophenyl group, a 4-cyanophenyl group, a 4-sulfonatophenyl group, a 4-methoxyphenyl group, a 4-ethoxyphenyl group, a 4-benzyloxyphenyl group, a 4-phenoxyphenyl group, a 4-carboxyphenyl group, a 4-acetoxyphenyl group, a 4-benzoylphenyl group, a 4-(ethoxycarbonyl)phenyl group, a 4-(phenoxycarbonyl)phenyl group, a 4-guanidinophenyl group, a 2,4-diguanidinophenyl group, a 4-(acetylamino) phenyl group, a 4-(benzoylamino)phenyl group, a 4-(dimethylaminosulfonyl)phenyl group, a 2-methyl-4-methoxyphenyl group, a 2-methyl-4-nitrophenyl group, 2-methoxy-4-guanidinophenyl group, a 2-methoxy-4-(acetylamino) phenyl group, a naphthyl group, and a biphenyl group.

Preferable among, these are a phenyl group, a 2-methylphenyl group, a 3-methylphenyl group, a 4-methylphenyl group, a 4-aminophenyl group, and a 4-guanidinophenyl group, and more preferable are a phenyl group and a 2-methylphenyl group because guanidine compounds with such groups are easily available, increase the curability of the organic polymer (A), and effectively suppress stickiness on the surface of a cured product to be provided. For the same reason, the guanidine compound (B) is preferably a compound represented by formula (2).

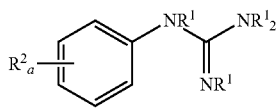
(2)

In formula (2), each of the four $R^1$s is independently a hydrogen atom, a hydroxy group, an amino group, a nitro group, a cyano group, a sulfonic acid group, or an organic group; each of the a $R^2$s is at least one selected from the group consisting of a hydrogen atom, a halogen atom, a hydroxy group, an amino group, a nitro group, a cyano group, a sulfonic acid group, and an organic group; and a is an integer of 1 to 5.

Each of the four $R^1$s in formula (2) is a hydrogen atom, a hydroxy group, an amino group, a nitro group, a cyano group, a sulfonic acid group, or an organic group. In the case that any one of the $R^1$s in formula (2) is an organic group, examples of the organic group include, but are not particularly limited to, saturated or unsaturated hydrocarbon groups; organic groups in which at least one hydrogen atom in a hydrocarbon group is substituted by a functional group having at least one selected from a nitrogen atom, an oxygen atom, and a sulfur atom; and groups such as an alkoxy group, a carboxy group, an acyl group, a carbonyl group, an imino group, and a sulfonyl group.

$R^1$ in formula (1) or formula (2) not being an aryl group is preferably a hydrogen atom, an amino group, or an organic group, more preferably a hydrogen atom or a hydrocarbon group, and particularly preferably a hydrogen atom or a saturated hydrocarbon group because guanidine compounds with such groups increase the curability of the organic polymer (A). In the case that $R^1$ is an organic group, C1 to C20 organic groups are preferable and C1 to C10 organic groups are more preferable for easy availability.

The guanidine compound (B) is required to have a guanidyl group substituted with at least one aryl group as described above. However, as the number of aryl substituents increases, the effect of improving the curability of the organic polymer (A) decreases. Accordingly, the number of aryl substituents in the guanidyl group is preferably one.

At least one of the $R^1$s in formula (1) or formula (2) is preferably an organic group represented by —C(=NR$^{13}$)—NR$^{13}{}_2$ (here, each of the three $R^{13}$s is independently a hydrogen atom or an organic group) for better adhesiveness of the cured product to be provided. In the case that the at least one $R^1$ is an organic group represented by —C(=NR$^{13}$)—NR$^{13}{}_2$, each of the three $R^{13}$s is preferably independently a hydrogen atom or a hydrocarbon group and more preferably a hydrogen atom or a saturated hydrocarbon group for easy availability and better adhesiveness of the cured product to be provided.

The guanidine compound of formula (1) or formula (2) is referred to as a biguanide compound in the case that at least one $R^1$ is an organic group represented by the above —C(=NR$^{13}$)—NR$^{13}{}_2$.

Each of the a $R^2$s in formula (2) may be a hydrogen atom, a halogen atom, a hydroxy group, an amino group, a nitro group, a cyano group, a sulfonic acid group, or an organic group. In the case that any one of the $R^2$s is an organic group, examples of the organic group include, but are not particularly limited to, saturated or unsaturated hydrocarbon groups; organic groups in which at least one hydrogen atom in a hydrocarbon group is substituted by a functional group having at least one selected from a nitrogen atom, an oxygen atom, and a sulfur atom; and groups such as an alkoxy group, a carboxy group, an acyl group, a carbonyl group, an imino group, and a sulfonyl group.

Among these, a hydrogen atom, an amino group, and an organic group are preferable, a hydrogen atom and a hydrocarbon group are more preferable, and a hydrogen atom and a saturated hydrocarbon group are particularly preferable because guanidine compounds with such groups increase the curability of the organic polymer (A). In the case that $R^2$ is an organic group, C1 to C20 organic groups are preferable and C1 to C10 organic groups are more preferable for easy availability.

The guanidine compound (B) has preferably 2 or more carbon atoms, more preferably 6 or more carbon atoms, and particularly preferably 7 or more carbon atoms. If the guanidine compound (B) has as small as less than 2 carbon atoms (has a small molecular weight), the compound is likely to have higher volatility, deteriorating the working environment. The upper limit of the carbon number in the guanidine compound (B) is not necessarily limited, and is preferably 10,000 or less in general. The guanidine compound (B) has a molecular weight of preferably 60 or more, more preferably 120 or more, and particularly preferably 130 or more for the aforementioned reasons. The upper limit of the molecular weight is not necessarily limited, and is preferably 100,000 or less in general.

The guanidine compound (B) is not particularly limited. Examples thereof include: guanidine compounds such as 1-phenylguanidine, 1-(o-tolyl)guanidine, 1-(3-methylphenyl)guanidine, 1-(4-methylphenyl)guanidine, 1-(2-chlorophenyl)guanidine, 1-(4-chlorophenyl)guanidine, 1-(2,3-xylyl)guanidine, 1-(2,6-xylyl)guanidine, 1-(1-naphthyl)guanidine, 1,1-diphenylguanidine, 1,2-diphenylguanidine, 1,3-diphenylguanidine, 1,3-bis(2-methylphenyl)guanidine, 1-phenyl-1-methylguanidine, 1-(4-chlorophenyl)-3-(1-methylethyl)guanidine, 1,2,3-triphenylguanidine, 1-(3,4-dichlorophenyl)-3-(1-methylethyl)guanidine, 1-(4-methylphenyl)-3-octylguanidine, 1,1'-hexamethylenebis[3-(4-chlorophenyl)guanidine], 1-(4-methoxyphenyl)guanidine, 1,1'-[4-(dodecyloxy)-m-phenylene]bisguanidine, 1-(4-nitrophenyl)guanidine, 4-guanidinobenzoic acid, 1-(4-chlorophenyl)-2-cyanoguanidine, 2-(phenylimino)imidazolidine, 2-(5,6,7,8-tetrahydronaphthalen-1-ylamino)-2-imidazoline, N-(2-imidazolin-2-yl)-2,3-xylidine, N-(2-imidazolin-2-yl)-1-naphthalenamine, and 1,1'-[methylenebis(p-phenylene)]bisguanidine; and biguanide compounds such as 1-phenylbiguanide, 1-(o-tolyl)biguanide, 1-(3-methylphenyl)biguanide, 1-(4-methylphenyl)biguanide, 1-(2-chlorophenyl)biguanide, 1-(4-chlorophenyl)biguanide, 1-(2,3-xylyl)biguanide, 1-(2,6-xylyl)biguanide, 1-(1-naphthyl)biguanide, 1,3-diphenylbiguanide, 1,5-diphenylbiguanide, 1-phenyl-1-methylbiguanide, 1-(4-chlorophenyl)-5-(1-methylethyl)biguanide, 1-(4-methylphenyl)-5-octylbiguanude, 1-(4-methoxyphenyl)biguanide, 1-(3,4-dichlorophenyl)-5-(1-methylethyl)biguanide, 1,1'-hexamethylenebis[5-(4-chlorophenyl)biguanide], 2-guanidino-1H-benzoimidazole, 1,1'-[4-(dodecyloxy)-m-phenylene]bisbiguanide, 1-(4-nitrophenyl)biguanide, and 4-[3-(amidino)guanidino]benzenesulfonic acid.

These guanidine compounds may be added alone, or may be added in combination to the curable composition.

Preferable among these guanidine compounds are 1-phenylguanidine, 1-(o-tolyl)guanidine, 1-phenylbiguanide, 1-(o-tolyl)biguanide and the like because these compounds are easily available, increase the curability of the organic polymer (A), and effectively suppress stickiness on the surface of the cured product.

The amount of the guanidine compound (B) is preferably 0.1 to 30 parts by weight, and more preferably 0.1 to 12 parts by weight, per 100 parts by weight of the organic polymer (A). The guanidine compound (B) in an amount of 0.1 to 30 parts by weight gives better curability to the curable composition, and allows the curable composition to cure in an appropriate time period, thereby providing excellent workability.

In order to improve the curability of the guanidine compound (B), a Lewis acid and/or a Lewis acid complex may be used in combination. This combination use is effective particularly for applications in which an accelerated curing rate is desired. The combination use also has an advantage in that the blending amount of curing catalyst can be reduced.

Examples of the Lewis acid include, but are not particularly limited to, halogenated metals such as titanium chloride, tin chloride, zirconium chloride, aluminium chloride, iron chloride, zinc chloride, copper chloride, antimony chloride, gallium chloride, indium chloride, titanium bromide, tin bromide, zirconium bromide, aluminum bromide, iron bromide, zinc bromide, and copper bromide; boron halides such as boron trifluoride, boron trichloride, boron tribromide, and boron triiodide; and metal triflate compounds such as trimethylsilyl trifluoromethanesulfonate, scandium triflate, yttrium triflate, and zinc triflate.

Preferable among these Lewis acids are titanium chloride, tin chloride, zirconium chloride, aluminium chloride, iron chloride, and boron trifluoride, and more preferable are titanium chloride, zirconium chloride, iron chloride, and boron trifluoride because they are easily available and easily handled.

Examples of the Lewis acid complex include, but are not particularly limited to, complexes containing the above Lewis acids. More specific examples thereof include amine complexes, alcohol complexes, ether complexes, and water complexes, of Lewis acids.

Examples of amine compounds from which the amine complexes of Lewis acids are derived include, but are not particularly limited to, ammonia, monoethylamine, triethylamine, 1,8-diazabicyclo[5.4.0]undec-7-ene (DBU), pyridine, piperidine, aniline, morpholine, cyclohexylamine, n-butylamine, monoethanolamine, diethanolamine, and triethanolamine.

Examples of alcohols from which the alcohol complexes of Lewis acids are derived include, but are not particularly limited to, methanol, ethanol, propanol, n-butanol, isopropanol, and 2-buthanol.

Examples of ethers from which the ether complexes of Lewis acids are derived include, but are not particularly limited to, dimethyl ether, diethyl ether, n-dibutyl ether, and tetrahydrofuran.

Preferable among those Lewis acid complexes are boron trifluoride-amine complexes, boron trifluoride-alcohol complexes, and boron trifluoride-ether complexes, more preferable are a boron trifluoride-ethylamine complex, a boron trifluoride-piperidine complex, a boron trifluoride-methanol complex, a boron trifluoride-ethanol complex, a boron trifluoride-diethyl ether complex, and a boron trifluoride-tetrahydrofuran complex, and particularly preferable is a boron trifluoride-diethyl ether complex because they are easily available and easily handled.

The blending amount of Lewis acid and/or Lewis acid complex is preferably 0.1 to 30 parts by weight, and more preferably 0.1 to 12 parts by weight for each 100 parts by weight of the organic polymer (A). The Lewis acid and/or Lewis acid complex in an amount of 0.1 to 30 parts by weight may give excellent curability to the curable composition, and allow the curable composition to cure in an appropriate time period, thereby providing excellent workability.

The molar ratio of the guanidine compound (B) to the Lewis acid and/or Lewis acid complex in the curable composition is preferably 90:10 to 30:70, more preferably 80:20 to 40:60, and particularly preferably 70:30 to 50:50 because such ratios provide a large effect of suppressing stickiness on the surface of the cured product and gives good adhesiveness to the cured product.

The curable composition of the present invention comprises the guanidine compound (B) as a curing catalyst, and may further comprise other curing catalysts if necessary as long as they never inhibit the effects of the present invention.

The curing catalyst other than the guanidine compound (B) is not particularly limited. Examples thereof include: metal salts of carboxylic acids such as tin carboxylates, lead carboxylates, bismuth carboxylates, potassium carboxylates, calcium carboxylates, barium carboxylates, titanium carboxylates, zirconium carboxylates, hafnium carboxylates, vanadium carboxylates, manganese carboxylates, iron carboxylates, cobalt carboxylates, nickel carboxylates, and cerium carboxylates; titanium compounds such as tetrabutyl titanate, tetrapropyl titanate, titanium tetrakis(acetylacetonate), diisopropoxytitanium bis(acetylacetonate), and diisopropoxytitanium bis(ethylacetoacetate); organotin compounds such as dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis(acetylacetonate), dibutyltin bis(ethylacetoacetonate), reaction products of dibutyltin oxide with silicate compounds, and reaction products of dibutyltin oxide and phthalate esters; aluminum compounds such as aluminum tris(acetylacetonate), aluminum tris(ethylacetoacetate), and diisopropoxyaluminum ethylacetoacetate; zirconium compounds such as zirconium tetrakis (acetylacetonate); metal alkoxides such as tetrabutoxyhafnium; organic acidic phosphate esters; organic sulfonic acids such as trifluoromethanesulfonic acid; and inorganic acids such as hydrochloric acid, phosphoric acid, and boronic acid.

These curing catalysts may be used with the guanidine compound (B) in expectation of an increase in catalytic activity and improvement in properties such as the depth curability and thin-layer curability of the curable composition and the adhesiveness of a cured product to be provided therefrom.

In the case that an organotin compound is used together, the toxicity of the curable composition is likely to increase as the amount of organotin is increased. Thus, the amount of organotin compound is preferably small. More specifically, the amount of organotin compound, calculated as a metal tin, is preferably 5 parts by weight or less, more preferably 0.5 parts by weight or less, and further preferably 0.05 parts by weight or less, for each 100 parts by weight of the organic polymer (A). Most preferably, the curable composition is substantially free from any organotin compound.

For the aforementioned reasons, the curable composition of the present invention is preferably a non-organotin curable composition. The non-organotin curable composition herein is defined as one containing 50% by weight or less of an organotin compound(s) relative to the total amount of compounds serving as silanol condensation catalysts. The non-organotin curable composition contains an organotin compound(s) in an amount of preferably 30% by weight or less, more preferably 10% by weight or less, and further preferably 1% by weight or less. Most preferably, the non-organotin curable composition is free from any organotin compound.

In the case that a metal compound other than an organotin is used together, the amount thereof is preferably small in consideration of environmental load. More specifically, the amount is preferably 5 parts by weight or less, and more preferably 2 parts by weight or less, for each 100 parts by weight of the organic polymer (A). Particularly preferably, the curable composition is free from any metal compound.

The curable composition of the present invention is preferably a non-organotin curable composition. In consideration of toxicity or environmental load, the curable composition of the present invention is more preferably a non-tin curable composition which is substantially free from tin compounds such as organotin compounds and tin carboxylates; further preferably a non-organotin and non-metal carboxylate curable composition which is substantially free from organotin compounds and metal carboxylates; and particularly preferably a non-metal catalyst curable composition which is substantially free from the metal element-containing curing catalysts mentioned above, such as metal carboxylates, titanium compounds, organotin compounds, organoaluminum compounds, and zirconium compounds.

The curable composition of the present invention may contain a carboxylic acid as a promoter if necessary to the extent that the acid does not deteriorate the effects of the present invention.

The carboxylic acid used as a promoter is not particularly limited. Examples thereof include: straight-chain saturated fatty acids such as acetic acid, propionic acid, butyric acid, valeric acid, caproic acid, enanthic acid, caprylic acid, 2-ethylhexanoic acid, pelargonic acid, capric acid, undecanoic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanic acid, melissic acid, and lacceric acid; monoenoic unsaturated fatty acids such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselinic acid, oleic acid, elaidic acid, asclepic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid, and 10-undecenoic acid; polyenoic unsaturated fatty acids such as linoelaidic acid, linolic acid, 10,12-octadecadienoic acid, hiragonic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, nisinic acid, and docosahexaenoic acid; branched fatty acids such as 1-methylbutyric acid, isobutyric acid, 2-ethylbutyric acid, isovaleric acid, tuberculostearic acid, pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, and versatic acid; triple bond-containing fatty acids such as propiolic acid, tariric acid, stearolic acid, crepenynic acid, xymenynic acid, and 7-hexadecynoic acid; alicyclic carboxylic acids such as naphthenic acid, malvalic acid, sterculic acid, hydnocarpic acid, chaulmoogric acid, gorlic acid, 1-methylcyclopentanecarboxylic acid, 1-methylcyclohexanecarboxylic acid, 2-methylbicyclo[2.2.1]-5-heptene-2-carboxylic acid, 1-adamantanecarboxylic acid, bicyclo[2.2.1]heptane-1-carboxylic acid, and bicyclo[2.2.2]octane-1-carboxylic acid; oxygen-containing fatty acids such as acetoacetic acid, ethoxyacetic acid, glyoxylic acid, glycolic acid, gluconic acid, sabinic acid, 2-hydroxytetradecanoic acid, ipurolic acid, 2,2-dimethyl-3-hydroxypropionic acid, 2-hydroxyhexadecanoic acid, jalapinolic acid, juniperic acid, ambrettolic acid, aleuritic acid, 2-hydroxyoctadecanoic acid, 12-hydroxyoctadecanoic acid, 18-hydroxyoctadecanoic acid, 9,10-dihydroxyoctadecanoic acid, ricinolic acid, camlolenic acid, licanic acid, pheronic acid, cerebronic acid, and 2-methyl-7-oxabicyclo[2.2.1]-5-heptene-2-carboxylic acid; and halogen-substituted products of monocarboxylic acids such as chloroacetic acid, 2-chloroacrylic acid, and chlorobenzoic acid.

Examples of an aliphatic dicarboxylic acid include: saturated dicarboxylic acids such as adipic acid, azelaic acid, pimelic acid, suberic acid, sebacic acid, ethylmalonic acid, glutaric acid, oxalic acid, malonic acid, succinic acid, oxydiacetic acid, dimethylmalonic acid, ethylmethylmalonic acid, diethylmalonic acid, 2,2-dimethylsuccinic acid, 2,2-diethylsuccinic acid, 2,2-dimethylglutaric acid, and 1,2,2-trimethyl-1,3-cyclopentanedicarboxylic acid; and unsaturated dicarboxylic acids such as maleic acid, fumaric acid, acetylenedicarboxylic acid, and itaconic acid.

Examples of an aliphatic polycarboxylic acid include tricarboxylic acids such as aconitic acid, 4,4-dimethylaconitic acid, citric acid, isocitric acid, and 3-methylisocitric acid. Examples of an aromatic carboxylic acid include: aromatic monocarboxylic acids such as benzoic acid, 9-anthracenecarboxylic acid, atrolactic acid, anisic acid, isopropylbenzoic acid, salicylic acid, and toluic acid; and aromatic polycarboxylic acids such as phthalic acid, isophthalic acid, terephthalic acid, carboxyphenylacetic acid, and pyromellitic acid. Such a promoter may be used together in expectation of an increase in the catalytic activity of curing agent and improvement in properties such as curability and depth curability of the curable composition.

The amount of carboxylic acid is preferably 0.01 to 20 parts by weight, and more preferably 0.1 to 10 parts by weight, for each 100 parts by weight of the polymer (A).

The curable composition of the present invention comprises as the component (C) a phosphorus compound that has an aryl group, has a phosphorus atom with an oxidation number of +5, and has a melting point of 23° C. or higher. A curable composition containing the component (B) as a curing catalyst has some problems. One of the problems is that the curable composition gives a cured product that tends to be gradually yellowed on the surface thereof, and have worse discoloration when exposed outdoors. Another problem is that the cured product has a slightly inferior surface weather resistance compared to a cured product of a curable composition containing a dialkyltin compound which is widely used as a curing catalyst for the reactive silyl group-containing organic polymer (A). Those problems are more significant as the amount of the component (B) is larger. However, those problems can be solved by adding the component (C), namely a phosphorus compound that has an aryl group, has a phosphorus atom with an oxidation number of +5, and has a melting point of 23° C. or higher. Also, a curable composition containing phenylguanidine as the component (B) has a problem in which its cured product has circular patterns on the surface thereof few days after curing. However, adding the component (C) also has an effect of suppressing occurrence of these patterns.

The component (C) is a phosphorus compound containing at least one aryl group. This is because phosphorus compounds containing an aryl group are likely to have high compatibility with the component (B) of the present invention. The structure of the phosphorus compound having an aryl group may be represented by formula (11).

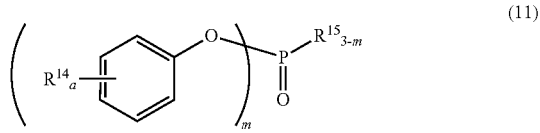

The structure may alternatively be represented by formula (12).

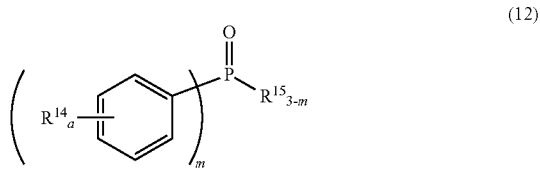

In the formulas, each of the a $R^{14}$s is at least one selected from the group consisting of a hydrogen atom, a halogen atom, a hydroxy group, an amino group, a nitro group, a cyano group, a sulfonic acid group, and an organic group; a is an integer of 1 to 5; each of the (3-m) $R^{15}$s is at least one selected from the group consisting of a hydrogen atom, a halogen atom, a hydroxy group, an amino group, a nitro group, a cyano group, a sulfonic acid group, and an organic group; and m is an integer of 1 to 3. Examples of the phosphorus compound having an aryl group include, but are not limited to, triphenyl phosphate, tris(nonylphenyl)phosphate, tris(2,4-di-t-butylphenyl)phosphate, diethyl benzylphosphonate, tri(hydroxy-methylphenyl) phosphate, sodium bis(4-tert-butylphenyl)phosphate, diethyl 3,5-di-tert-butyl-4-hydroxybenzyl phosphate, and 1,3-bis(diphenoxyphosphonyloxy)benzene.

The phosphorus compound (C) of the present invention may have a ring structure with a phosphorus atom and an aryl group. Examples of a phosphorus compound having a ring structure include, but are not limited to, 9,10-dihydro-9-oxa-10-phosphaphenanthrene-10-oxide, and sodium 2,2'-methylene bis(4,6-di-tert-butylphenyl)phosphate. Also, HCA, HCA-HQ, SANKO-BCA, M-Ester, and ME-P8 (all of these are trade names) produced by Sanko Co., Ltd. may be used.

More specifically, the phosphorus compound as the component (C) is a phosphorus compound having a phosphorus atom with an oxidation number of +5. Although a phosphorus atom can have an oxidation number of −3, −1, +1, +3, or +5, the phosphorus compound according to the present invention is required to have a phosphorus atom with an oxidation number of +5 so that the effects of the present invention can be achieved.

The component (C) is preferably a phosphate ester compound. The phosphate ester compound is represented by formula (13):

wherein each of the three $R^{13}$s is independently a hydrogen atom or an organic group, provided that at least one of the $R^{13}$s is an organic group. The compound having one, two, and three organic groups as $R^{16}$ substituent is respectively referred to as a phosphate monoester, a phosphate diester, and a phosphate triester. These esters are collectively referred to as phosphate ester compounds.

Phosphate monoesters and phosphate diesters, having a P—OH structure in a molecule, are also referred to as acidic phosphate esters. These phosphorus compounds having a P—OH structure function as silanol condensation catalysts, and are therefore not suitable for the curable composition of the present invention having the component (B). Phosphate ester compounds, however, are present largely as mixtures with partial esters, and it is difficult to completely remove these partial esters. Hence, the curable composition may contain some partial esters only in a small amount. More specifically, the total amount of phosphate ester compounds having a P—OH structure is preferably 2 parts by weight or less, more preferably 1 part by weight or less, and particularly preferably 0.05 parts by weight or less, for each 100 parts by weight of the organic polymer (A). Examples of the phosphate monoesters and phosphate diesters mentioned above include, but are not limited to, phenyl phosphate, cresyl phosphate, dicresyl phosphate, 2-ethylhexyl phenyl phosphate, and cresyl phenyl phosphate.

For the same reason, the amount of phosphoric acid, having a P—OH structure, is preferably 2 parts by weight or less, more preferably 1 part by weight or less, and particularly preferably 0.05 parts by weight or less, for each 100 parts by weight of the organic polymer (A).

Phosphate triester compounds, which are completely esterified, do not have the above problem, and are therefore preferable as the component (C) according to the present invention. Examples of the phosphate triester compounds include, but are not limited to, triphenyl phosphate, tris(biphenyl)phosphate, tris(2,4-di-tert-butylphenyl) phosphate, 2-ethylhexyl diphenyl phosphate, diphenyl methyl phosphate, and cresyl diphenyl phosphate.

The phosphorus compound as the component (C) may be polyoxyethylene alkyl phenyl ether phosphate which is generally used as a surfactant.

Phosphorus compounds other than the above-mentioned ones can also be used. Examples thereof include phenylphosphonic acid, benzylphosphonic acid, phenylphosphonic dichloride, benzylphosphonic dichloride, dimethyl phenylphosphonate, dimethyl benzylphosphonate, diethyl phenylphosphonate, diethyl benzylsulfonate, benzyltriphenylphosphonium chloride, diphenylphosphinous chloride, bis(benzyldiphenylphosphoranediyl)ammonium chloride, diethyl benzylphosphonate, diethyl (p-methylbenzyl)phosphonate, and 1-hydroxyethylidene-1,1'-diphosphonate melamine salt.

The component (C) may be a metal salt of a phosphorus compound. Metal salts of phosphorus compounds are particularly preferable because they effectively reduce discoloration and do not impair the storage stability of the curable composition. Preferable metals used for the metal salts of phosphorus compounds are alkali metals, alkaline-earth metals, and zinc. Examples of the alkali metals include sodium, potassium, and lithium. Examples of the alkaline-earth metals include calcium, magnesium, barium, and strontium. Among these, alkali metals and zinc are particularly preferable, and sodium, potassium, lithium, calcium, and zinc are further preferable. Examples of the metal salts of phosphorus compounds include, but are not limited to, sodium monododecyl phosphate, disodium phenyl phosphate, sodium di(p-tolyl)phosphate, calcium di(p-tolyl) phosphate, a zinc salt of stearyl acid phosphate, sodium bis(4-tert-butylphenyl) phosphate, and sodium 2,2'-methylene bis(4,6-di-tert-butylphenyl)phosphate.

The phosphorus compound as the component (C) preferably has a high boiling point. This is because a phosphorus compound having a low boiling point may easily evaporate after curing of the curable composition, and thus the effects of the present invention may not be maintained for a long time. More specifically, the phosphorus compound preferably has a boiling point at 760 mmHg of 150° C. or higher, more preferably 200° C. or higher, and particularly preferably 250° C. or higher.

Among the above phosphorus compounds, phosphorus compounds represented by the following formula (14) are preferable.

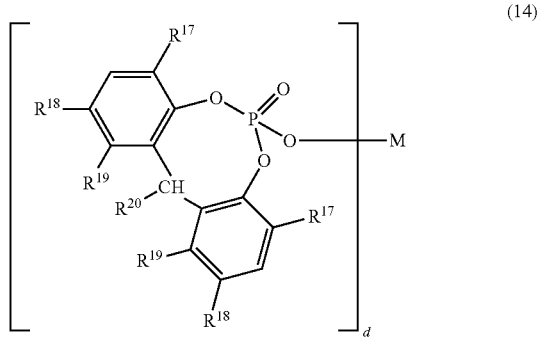

(14)

In the formula, each of the $R^{13}$s, $R^{18}$s, and $R^{19}$s independently represents a hydrogen atom or a C1-C18 linear or branched alkyl group or a hydroxyl group; $R^{20}$ represents a hydrogen atom or a methyl group; d represents 1 or 2; and M represents a hydrogen atom or an alkali metal atom in the case that d is 1, and M represents an alkaline-earth metal atom or a zinc atom in the case that d is 2.

Among the above phosphorus compounds, sodium 2,2'-methylene bis(4,6-di-tert-butylphenyl)phosphate is preferable. This phosphorus compound having the following structure is offered by ADEKA Corporation under the trade name T-629 and is easily available.

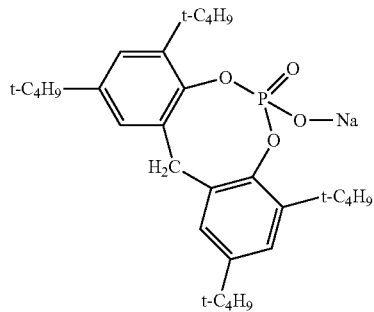

A phosphorus compound that is a lithium salt in place of the sodium salt of T-629 is also effective and preferable. In addition, this compound may be used with the addition of a fatty acid salt.

The component (C) may be only one species or may be a combination of two or more species.

The blending amount of the component (C) is preferably 2 to 20 parts by weight, more preferably 3 to 15 parts by weight, and particularly preferably 5 to 10 parts by weight, for each 100 parts by weight of the organic polymer (A). This is because a blending amount of the component (C) of less than 2 parts by weight may not sufficiently solve the problems arising on the surface of the cured product, while a blending amount of the component (C) of more than 20 parts by weight tends to decrease adhesiveness of the cured product and may be economically disadvantageous.

Phosphorous acid and phosphite ester compounds having a phosphorus atom with an oxidation number of +3 are widely used industrially as flame retardants or plasticizers. However, these compounds tend to cause bad odor when combined with the component (B), and are thus not suitable for use in the curable composition of the present invention. Phosphite ester compounds still can be used without particular problems as long as being blended in an amount that does not cause bad odor. The blending amount thereof is preferably 2 parts by weight or less, and more preferably 1 part by weight or less, for each 100 parts by weight of the component (A).

Examples of the phosphite ester compounds include, but are not limited to, trimethyl phosphite, triethyl phosphite, tripropyl phosphite, tributyl phosphite, trihexyl phosphite, tri-2-ethylhexyl phosphite, tridecyl phosphite, trioctadecyl phosphite, tris(2-chloroethyl)phosphite, triphenyl phosphite, tricresyl phosphite, tris(biphenyl)phosphite, tris(2,4-di-tert-butylphenyl)phosphite, dimethyl phosphite, diethyl phosphite, dipropyl phosphite, dibutyl phosphite, dihexyl phosphite, di-2-ethylhexyl phosphite, didecyl phosphite, tetraphenyl dipropyleneglycol diphosphite, tetraphenyl tetra(tridecyl)pentaerythritol tetraphosphite, bis(nonylphenyl) pentaerythritol diphosphite, and 4,4'-butylidene-bis(3-methyl-6-t-butylphenyl-di-tridecyl)phosphite.

Examples of phosphorus compounds having a phosphorus atom with an oxidation number of +3, other than the phosphite esters, include, but are not limited to, tetramethylphosphonium bromide, tetraethylphosphonium bromide, tetrapropylphosphonium bromide, tetrabutylphosphonium bromide, tetrahexylphosphonium bromide, tetraphenylphosphonium tetraphenylborate, tetrabutylphosphonium hydroxide, tricyclohexylphosphine, tri-m-tolylphosphine, triphenylphosphine, triphenylphosphine oxide, tri-n-butylphosphine, and 1,4-bis(diphenylphosphino)butane.

To the curable composition of the present invention, a plasticizer may be added if necessary.

Examples of the plasticizer include phthalate esters such as bis(2-ethylhexyl)phthalate, diisodecyl phthalate, diisononyl phthalate, and butyl benzyl phthalate; non-aromatic dibasic acid esters such as dioctyl adipate, dioctyl sebacate, and isodecyl succinate; aliphatic esters such as butyl oleate and methyl acetylricinoleate; phosphate esters such as tricresyl phosphate; trimellitate esters; sulfonate esters such as phenyl hexadecanesulfonate; chlorinated paraffins; hydrocarbon oils such as alkyldiphenyls and partially hydrogenated terphenyls; process oils; and epoxy plasticizers.

Among the plasticizers, phthalate ester plasticizers may contribute to production of curable compositions having excellent curability. Among the phthalate ester plasticizers, bis(2-ethylhexyl)phthalate, bis(2-propylhexyl)phthalate, diisodecyl phthalate, and diisononyl phthalate are preferable for their easy availability. Also, a plasticizer produced by hydrogenating diisononyl phthalate is preferable because such a plasticizer has excellent safety and a low viscosity, and thus provides good workability when contained in the curable composition of the present invention. This plasticizer is offered under the trade name Hexamoll DINCH by BASF and easily available.

Examples of a polymer plasticizer include vinyl polymers; esters of polyalkylene glycols; polyester plasticizers; polyether polyols such as polypropylene glycols; polystyrenes; and polybutadiene, polybutene and the like.

The polymer plasticizer preferably has a number-average molecular weight of 500 to 15000. The polymer plasticizer is preferably a reactive silyl group-containing polymer plasticizer because such a polymer plasticizer is involved in the curing reaction and can be prevented from transferring from the cured product to be provided. These plasticizers may be added alone, or may be added in combination.

The amount of plasticizer is preferably 5 to 150 parts by weight, more preferably 10 to 120 parts by weight, and particularly preferably 20 to 100 parts by weight, for each 100 parts by weight of the organic polymer (A).

The curable composition of the present invention may contain a silane coupling agent if necessary.

Examples of the silane coupling agent include amino silanes such as γ-aminopropyltrimethoxysilane, γ-aminopropyltriethoxysilane, γ-(2-(2-aminoethyl)aminoethyl)aminopropyltrimethoxysilane, 3-(N-ethylamino)-2-methylpropyltrimethoxysilane, and N-phenylaminomethyltrimethoxysilane; ketimine silanes such as N-(1,3-dimethylbutylidene)-3-(triethoxysilyl)-1-propaneamine; isocyanato silanes such as γ-isocyanatopropyltrimethoxysilane; mercapto silanes such as γ-mercaptopropyltrimethoxysilane; epoxy silanes such as γ-glycidoxypropyltrimethoxysilane; carboxy silanes such as β-carboxyethyltriethoxysilane; vinyl unsaturated group-containing silanes such as vinyltrimethoxysilane, vinyltriethoxysilane, and γ-methacryloyloxypropylmethyldimethoxysilane; halogen-containing silanes such as γ-chloropropyltrimethoxysilane; and isocyanurate silanes such as tris(3-trimethoxysilylpropyl)isocyanurate. In addition, reaction products of the amino silanes and the epoxy silanes and reaction products of the amino silanes and the isocyanurate silanes are also usable.

The amount of silane coupling agent is preferably 0.01 to 20 parts by weight for each 100 parts by weight of the organic polymer (A).

In order to produce an adhesiveness-imparting effect, the curable composition of the present invention may contain additives such as epoxy resin, phenol resin, sulfur, alkyl titanates, and aromatic polyisocyanates if necessary. The amount of these additives is preferably 5 parts by weight or less for each 100 parts by weight of the organic polymer (A).

The curable composition of the present invention may contain a filler if necessary. Examples of the filler include reinforcing fillers such as fumed silica, precipitated silica, crystalline silica, fused silica, dolomite, silicic anhydride, hydrous silicic acid, and carbon black; heavy calcium carbonate, colloidal calcium carbonate, magnesium carbonate, diatomite, clay, talc, titanium oxide, bentonite, ferric oxide, fine aluminum powder, flint powder, zinc oxide, activated zinc white, shirasu balloons, glass microballoons, organic microballoons of phenol resin or vinylidene chloride resin, and organic powders such as PVC powder and PMMA powder; and fibrous fillers such as glass fiber and filaments.

The amount of filler is preferably 1 to 250 parts by weight, and more preferably 10 to 200 parts by weight, for each 100 parts by weight of the organic polymer (A).

In order to achieve a luxurious appearance, the curable composition of the present invention may contain a scaly or granular substance. Examples of the scaly or granular substance include natural materials such as silica sand and mica, synthetic rubber, synthetic resin, and inorganic materials such as alumina. The amount of scaly or granular substance is preferably 1 to 200 parts by weight for each 100 parts by weight of the curable composition.

The curable composition of the present invention may contain a silicate if necessary. Examples of the silicate include tetraalkoxysilanes such as tetramethoxysilane, and partially hydrolyzed condensation products derived therefrom. The amount of silicate is preferably 0.1 to 20 parts by weight for each 100 parts by weight of the organic polymer (A).

The curable composition of the present invention may contain a tackifier if necessary. Examples of the tackifier resin include styrene block copolymers, and hydrogenated products thereof, phenol resins, coumarone indene resins, rosin resins, xylene resins, styrene copolymer resins, petroleum resins (such as C5 hydrocarbon resins and C9 hydrocarbon resins), hydrogenated petroleum resins, terpene resins, and DCPD petroleum resins. The amount of tackifier is preferably 5 to 1,000 parts by weight for each 100 parts by weight of the organic polymer (A).

The curable composition of the present invention may contain a solvent or a diluent if necessary. Examples of the solvent and the diluent include aliphatic hydrocarbons, aromatic hydrocarbons, alicyclic hydrocarbons, halogenated hydrocarbons, alcohols, esters, ketones, and ethers. These compounds may be added alone, or may be added in combination.

The curable composition of the present invention may contain a physical-property modifier if necessary. Preferable among physical-property modifiers are ones that generate a compound containing a monovalent silanol group in the molecule via hydrolysis because such modifiers reduce the modulus of the cured product to be provided without increasing the surface stickiness thereof. The amount of physical-property modifier is preferably 0.1 to 20 parts by weight for each 100 parts by weight of the organic polymer (A).

The curable composition of the present invention may contain a thixotropic agent if necessary. Examples of the thixotropic agent include polyamide waxes; hydrogenated castor oil derivatives; and metal soaps such as calcium stearate. Examples thereof further include powdery rubber having a particle size of 10 to 500 μm, and organic fiber. These thixotropic agents may be added alone, or may be added in combination. The amount of thixotropic agent is preferably 0.1 to 20 parts by weight for each 100 parts by weight of the organic polymer (A).

The curable composition of the present invention may contain a compound having an epoxy group in each molecule if necessary. Such an epoxy group-containing compound enhances restorability of the cured product to be provided.

Examples of the epoxy group-containing compound include epoxidized unsaturated fats and oils, epoxidized unsaturated fatty acid esters, alicyclic epoxy compounds, compounds such as epichlorohydrin derivatives, and mixtures thereof.

The amount of epoxy compound is preferably 50 parts by weight or less for each 100 parts by weight of the organic polymer (A).

The curable composition of the present invention may contain a photocurable substance if necessary. Examples of the photocurable substance include conventionally known ones such as organic monomers, oligomers, resins, and compositions containing these substances. Specific examples thereof include unsaturated acrylic compounds, polyvinyl cinnamates, and azidized resins. The amount of photocurable substance is preferably 0.1 to 20 parts by weight for each 100 parts by weight of the organic polymer (A).

The curable composition of the present invention may contain an oxygen-curable substance if necessary. Examples of the oxygen-curable substance include drying oils such as tung oil and linseed oil, and various alkyd resins produced by modification of such compounds; drying oil-modified acrylic polymers, epoxy resins, and silicone resins; liquid polymers such as 1,2-polybutadiene, 1,4-polybutadiene, and C5-C8 diene polymers; and liquid copolymers such as NBR and SBR, which are produced by copolymerizing such a diene compound and a vinyl compound copolymerizable therewith, e.g., acrylonitrile or styrene, such that the diene compound serves as the main component. The amount of oxygen-curable substance is preferably 0.1 to 20 parts by weight for each 100 parts by weight of the organic polymer (A).

The curable composition of the present invention may contain an antioxidant if necessary. Examples of the antioxidant include hindered phenol antioxidants such as BHT. The amount of antioxidant is preferably 0.1 to 10 parts by weight for each 100 parts by weight of the organic polymer (A).

The curable composition of the present invention may contain a light stabilizer if necessary. Examples of the light stabilizer include hindered amine compounds, benzoate compounds, and salicylate compounds. Preferable among these are hindered amine light stabilizers for their high weather resistance. Among the hindered amine light stabilizers, hindered amine light stabilizers having an N—CH$_3$ or N—O-alkyl structure, not an NH piperidine structure, are preferable because the use of such a light stabilizer for the present invention leads to less crystals on the surface of the cured product.

The amount of light stabilizer is preferably 0.1 to 10 parts by weight for each 100 parts by weight of the organic polymer (A).

The curable composition of the present invention may contain an ultraviolet absorber if necessary. Examples of the ultraviolet absorber include benzophenone compounds, benzotriazole compounds, substituted tolyl compounds, and metal chelate compounds. The amount of ultraviolet absorber is preferably 0.1 to 10 parts by weight for each 100 parts by weight of the organic polymer (A).

The curable composition of the present invention may contain an epoxy resin if necessary. The epoxy resin improves adhesiveness of the cured product to be provided, and curable compositions containing the epoxy resin can be suitably used as adhesives, especially adhesives for exterior wall tiles.

Examples of the epoxy resin include epichlorohydrin-bisphenol A epoxy resin, novolac epoxy resin, hydrogenated bisphenol A epoxy resin, alicyclic epoxy resins, N,N-diglycidylaniline, triglycidyl isocyanurate, polyalkylene glycol diglycidyl ethers, glycidyl ethers of polyalcohols such as glycerin, hydantoin epoxy resin, and epoxidized products of unsaturated polymers such as petroleum resins.

In the case that the curable composition of the present invention contains the epoxy resin, the curable composition preferably further contains a curing agent for the epoxy resin Examples of the curing agent for the epoxy resin include primary and secondary amines such as triethylenetetramine, N-aminoethylpiperidine, m-xylylenediamine, m-phenylenediamine, isophoronediamine, and amine-terminated polyethers; tertiary amines such as 2,4,6-tris(dimethylaminomethyl)phenol, and salts of these tertiary amines; polyamide resins; imidazoles; dicyandiamides; alcohols; phenols; carboxylic acids; and diketone complex compounds of aluminum or zirconium.

Preferable among the curing agents for the epoxy resin are ketimine compounds because they allow production of one-pack type curable compositions. The ketimine compound is stable in the absence of moisture, but is decomposed into a primary amine and a ketone by moisture; the generated primary amine serves as a curing agent for curing the epoxy resin at room temperature.

The curable composition of the present invention may contain a flame retardant if necessary. Examples of the flame retardant include phosphorus-based plasticizers such as ammonium polyphosphate and tricresyl phosphate, aluminium hydroxide, and thermally expandable graphite. These flame retardants may be used alone, or may be used in combination. The amount of flame retardant is preferably 5 to 200 parts by weight for each 100 parts by weight of the component (A).

The curable composition of the present invention may contain various additives other than the aforementioned additives if necessary. Examples of the additives include curability modifiers, radical inhibitors, metal deactivators, antiozonants, phosphorus type peroxide decomposers, lubricants, pigments, blowing agents, repellents for ants, and antifungal agents. These additives may be used alone or may be used in combination.

In the case that the curable composition is of one-pack type, a formulation ingredient that contains moisture is preferably dehydrated and dried prior to the addition, or is preferably dehydrated by pressure reduction or the like operation during the blending and kneading.

In the case that the curable composition is of two-pack type, a curing catalyst is not required to be blended in the base mixture including the reactive silyl group-containing organic polymer. Thus, the composition is less likely to cure (gelate) even though some moisture exists in the formulation ingredients; if long-time storage stability is required, however, the formulation ingredients are preferably dehydrated and dried. Preferable examples of the dehydrating or drying method include: heat drying and vacuum dehydration in the case that the formulation ingredients are solids such as powder; and vacuum dehydration, and dehydration with substances such as synthetic zeolite, silica gel, and magnesium oxide in the case that the formulation ingredients are liquids. In addition, addition of an alkoxysilane compound, an oxazolidine compound, or an isocyanate compound improves the storage stability of the curable composition. In the case of adding an alkoxysilane compound (e.g., vinyltrimethoxysilane), which can react with moisture, for the purpose of drying, the amount thereof is preferably 0.1 to 20 parts by weight for each 100 parts by weight of the organic polymer (A).

The curable composition of the present invention may be prepared by a conventionally known method. Examples thereof include a method in which the aforementioned ingredients are mixed and kneaded at room temperature or under heating with a mixer, roller, kneader or the like; and a method in which the ingredients are dissolved in a small amount of an appropriate solvent and then mixed.

EXAMPLES

The following will specifically describe the present invention referring to non-limitative examples and comparative examples.

Synthesis Example 1

Propylene oxide was polymerized in the presence of polyoxypropylene triol having a molecular weight of about 3,000 as an initiator and a zinc hexacyanocobaltate glyme complex catalyst, so that a polypropylene oxide was provided which had a number-average molecular weight of about 26,000 (polystyrene-equivalent molecular weight determined with a TOSOH model HLC-8120 GPC solvent delivery system, a TOSOH model TSK-GEL H type column, and THF as a solvent). Then, a solution of NaOMe in methanol was added in an amount corresponding to 1.2 molar equivalents to hydroxy groups of the produced hydroxy-terminated polypropylene oxide, and the methanol was distilled off. In addition, allyl chloride was added, and thereby each terminal hydroxy group was converted to an allyl group. Unreacted allyl chloride was devolatilized under reduced pressure.

Next, n-hexane (300 parts by weight) and water (300 parts by weight) were added to the resulting unpurified allyl-terminated polypropylene triol (100 parts by weight) and then the mixture was stirred. The resultant mixture was centrifuged so that the water was removed. Water (300 parts by weight) was further added to the resulting hexane solution and the mixture was stirred. The mixture was then centrifuged again so that the water was removed, and the hexane was devolatilized under reduced pressure. Thereby, an allyl-terminated trifunctional polypropylene oxide having a number-average molecular weight of about 26,000 was produced.

The produced allyl-terminated trifunctional polypropylene oxide (100 parts by weight) and hexane (2 parts by weight) were charged into a 1-L autoclave, and were azeotropically dehydrated at 90° C. Then, the hexane was removed under reduced pressure, and the atmosphere was replaced by nitrogen. The resulting product was reacted with trimethoxysilane (1.28 parts by weight) for 5 hours at 90° C. in the presence of a solution of a platinum-divinyldisiloxane complex in isopropanol (150 ppm, platinum content: 3 wt %) as a catalyst. Thus, a trimethoxysilyl-terminated polyoxypropylene polymer (A-1) was prepared. As a result of $^1$H-NMR measurement (measured in a $CDCl_3$ solvent with JNM-LA400 produced by JEOL Ltd.), the average number of terminal trimethoxysilyl groups per molecule was found to be 1.8.

Synthesis Example 2

Polyoxypropylene diol having a molecular weight of about 2,000 and polyoxypropylene triol having a molecular weight of about 3,000 were mixed to provide a 1/1 (in weight ratio) mixture as an initiator. Propylene oxide was polymerized in the presence of the initiator and a zinc hexacyanocobaltate glyme complex catalyst to provide a polypropylene oxide having a number-average molecular weight of about 19,000 (polystyrene-equivalent molecular weight determined by the same method as in Synthesis Example 1). Next, a solution of NaOMe in methanol was added in an amount corresponding to 1.2 molar equivalents to hydroxy groups of the produced hydroxy-terminated polypropylene oxide, and the methanol was distilled off. Then, allyl chloride was added, and thereby each terminal hydroxy group was converted to an allyl group. Unreacted allyl chloride was devolatilized under reduced pressure. Thereby, an allyl-terminated polypropylene oxide having a number-average molecular weight of about 19,000 was produced.

Next, n-hexane (300 parts by weight) and water (300 parts by weight) were added to the resulting unpurified allyl-terminated polypropylene oxide (100 parts by weight) and then the mixture was stirred. The resultant mixture was centrifuged so that the water was removed. Water (300 parts by weight) was further added to the resulting hexane solution and the mixture was stirred. The mixture was then centrifuged again so that the water was removed, and then the hexane was devolatilized under reduced pressure. Thereby, an allyl-terminated polypropylene oxide having a number-average molecular weight of about 19,000 was produced.

The produced allyl-terminated polypropylene oxide (100 parts by weight) was reacted with methyldimethoxysilane (1.35 parts by weight) for 5 hours at 90° C. in the presence of a solution of a platinum-vinylsiloxane complex in isopropanol (150 ppm, platinum content: 3 wt %) as a catalyst. Thus, a methyldimethoxysilyl-terminated polypropylene oxide (A-2) was prepared.

As a result of $^1$H-NMR measurement (by the same method as in Synthesis Example 1), the average number of terminal methyldimethoxysilyl groups per molecule was found to be about 1.7.

Synthesis Example 3

Propylene oxide was polymerized in the presence of polypropylene glycol as an initiator and a zinc hexacyanocobaltate glyme complex catalyst to provide a polypropylene oxide having a number-average molecular weight of about 28,500 (polystyrene-equivalent molecular weight determined by the same method as in Synthesis Example 1). Next, a solution of NaOMe in methanol was added in an amount corresponding to 1.2 molar equivalents to hydroxy groups of the produced hydroxy-terminated polypropylene oxide, and the methanol was distilled off. Then, allyl chloride was added, and thereby each terminal hydroxy group was converted to an allyl group. Unreacted allyl chloride was devolatilized under reduced pressure.

Next, n-hexane (300 parts by weight) and water (300 parts by weight) were added to the resulting unpurified allyl-terminated polypropylene oxide (100 parts by weight) and then the mixture was stirred. The resultant mixture was centrifuged so that the water was removed. Water (300 parts by weight) was further added to the resulting hexane solution and the mixture was stirred. The mixture was then centrifuged again so that the water was removed, and the hexane was devolatilized under reduced pressure. Thereby, an allyl-terminated bifunctional polypropylene oxide having a number-average molecular weight of about 28,500 was produced.

The produced allyl-terminated polypropylene oxide (100 parts by weight) was reacted with triethoxysilane (1.48 parts by weight) for 2 hours at 90° C. in the presence of a solution of a platinum-vinylsiloxane complex in isopropanol (150 ppm, platinum content: 3 wt %) as a catalyst. Thereby, a triethoxysilyl-terminated polypropylene oxide was produced. As a result of $^1$H-NMR measurement, the average number of terminal triethoxysilyl groups per molecule was found to be 1.6.

The produced triethoxysilyl-terminated polypropylene oxide (100 parts by weight) was mixed with methanol (20 parts by weight) in the presence of a 0.5-wt % hydrochloric acid solution in methanol (0.24 wt %) as a catalyst, and the mixture was stirred for 2 hours at 70° C., so that the terminal triethoxysilyl groups were converted to trimethoxysilyl groups. Finally, the methanol was devolatilized under reduced pressure. Thus, a trimethoxysilyl-terminated polyoxypropylene polymer (A-3) was prepared. As a result of $^1$H-NMR measurement by the same method as mentioned above, the average number of terminal trimethoxysilyl groups per molecule was found to be 1.6.

Synthesis Example 4

ACCLAIM POLYOL 12200 (polypropylene glycol having a number-average molecular weight of about 11,000, product of Sumika Bayer Urethane Co., Ltd.) in an amount of 100 parts by weight and γ-isocyanatopropyltrimethoxysilane in an amount of 3.3 parts by weight were reacted for 2 hours at 90° C. in the presence of Neostann U-360 (mercapto tin catalyst produced by Nitto Kasei Co., Ltd., 30 ppm). The reaction was terminated after determining disappearance of the IR peak (2272 $cm^{-1}$) of isocyanate group. Thereby, a trimethoxysilyl-terminated polypropylene polymer (A-4) was prepared. As a result of $^1$H-NMR measurement by the same method as mentioned above, the average number of terminal trimethoxysilyl groups per molecule was found to be 1.9.

Synthesis Example 5

Propylene oxide was polymerized in the presence of polypropylene glycol as an initiator and a zinc hexacyanocobaltate glyme complex catalyst to provide a polypropylene oxide having a number-average molecular weight of about 14,600 (polystyrene-equivalent molecular weight determined by the same method as in Synthesis Example 1). Next, a solution of NaOMe in methanol was added in an amount corresponding to 1.2 molar equivalents to hydroxy groups of the produced hydroxy-terminated polypropylene oxide, and the methanol was distilled off. Then, allyl chloride was added, and thereby each terminal hydroxy group was converted to an allyl group. Unreacted allyl chloride was devolatilized under reduced pressure.

n-Hexane (300 parts by weight) and water (300 parts by weight) were added to the resulting unpurified allyl-terminated polypropylene oxide (100 parts by weight) and then the mixture was stirred. The resultant mixture was centrifuged so that the water was removed. Water (300 parts by weight) was further added to the resulting hexane solution and the mixture was stirred. The mixture was then centrifuged again so that the water was removed, and the hexane was devolatilized under reduced pressure. Thereby, an allyl-terminated bifunctional polypropylene oxide (b-1) having a number-average molecular weight of about 14,600 was produced.

A 300-ml three-necked flask was charged with 59 ml of acetone and 56 ml of triethylamine under a stream of dry nitrogen, and was then equipped with a magnetic stirrer, a capacitor, a dropping funnel, and an ice bath. Through the dropping funnel, 10 ml of trichlorosilane was dropped slowly over 40 minutes. The dropping speed was adjusted so that the internal temperature would not be higher than 60° C. After dropping, the mixture was heated at 60° C. for 90 minutes, and was sampled for $^1$H-NMR measurement. The measurement results showed that the peak of trichlorosilane disappeared and triisopropenoxysilane, the target product, was produced.

The produced allyl-terminated polypropylene oxide (b-1) (100 parts by weight) was reacted with the produced triisopropenoxysilane (1.97 parts by weight) for 4 hours at 120° C. in the presence of a solution of a platinum-vinylsiloxane complex in isopropanol (1000 ppm, platinum content: 3 wt %) as a catalyst. Thereby, a triisopropenoxysilyl-terminated polypropylene oxide (A-5) was prepared.

As a result of $^1$H-NMR measurement (by the same method as in Synthesis Example 1), the average number of terminal triisopropenoxysilyl groups per molecule was found to be about 0.9.

Mixing Example 1

To 1-phenylguanidine (product of Nippon Carbide Industries Co., Inc.), N-n-butylbenzenesulfonamide (product of Fuji Amide Chemical Co., Ltd., trade name: TOPCIZER No. 7) was added. The mixture was stirred well and then left in an oven at 80° C. for 30 minutes, whereby a yellow, transparent liquid (1-phenylguanidine solution) having a 1-phenylguanidine concentration of 45 wt % was produced.

Example 1

The following materials were weighed, mixed, and sufficiently kneaded: the trimethoxysilyl-terminated polyoxypropylene polymer (A-1) prepared in Synthesis Example 1 (100 parts by weight); surface-treated colloidal calcium carbonate (120 parts by weight, trade name: HAKUENKA CCR, product of Shiraishi Kogyo Kaisha, Ltd.); a diisodecyl phthalate plasticizer (45 parts by weight, trade name: DIDP, product of J-PLUS Co., Ltd.); dimethyl adipate (10 parts by weight, trade name: DMA, product of Daihachi Chemical Industry Co., Ltd.); titanium oxide as a white pigment (20 parts by weight, trade name: TIPAQUE R-820, product of Ishihara Sangyo Kaisha, Ltd.); an anti-sagging agent (2 parts by weight, trade name: DISPARLON 6500, product of Kusumoto Chemicals, Ltd.); a salicylate ultraviolet absorber (1 part by weight, trade name: Sumisorb 400, product of Sumitomo Chemical Co., Ltd.); a hindered amine light stabilizer (1 part by weight, trade name: SANOL LS-770, product of Sankyo Lifetech Co., Ltd.); and a phosphorus compound (5 parts by weight, trade name: T-629, product of ADEKA Corporation). Then, the mixture was passed through a three-roll paint mill three times for sufficient dispersion. Next, the mixture was dehydrated under reduced pressure for 2 hours at 120° C., and then cooled down to 50° C. or lower. Thereafter, the following materials were added to the mixture: vinyltrimethoxysilane as a dehydrating agent (2 parts by weight, trade name: A-171, product of Momentive Performance Materials Inc.); N-β-(aminoethyl)-γ-aminopropyltrimethoxysilane (1.5 parts by weight, trade name: A-1122, product of Momentive Performance Materials Inc.) and γ-aminopropyltrimethoxysilane (1.5 parts by weight, trade name: A-1110, product of Momentive Performance Materials Inc.) as adhesiveness-imparting agents; and the 1-phenylguanidine solution prepared in Mixing Example 1 as a curing catalyst (3.3 parts by weight). The mixture was then kneaded in a state substantially free from moisture. Thereafter, the mixture was hermetically packed in a cartridge that was a moisture-proof container. Thus, a one-component type curable composition was prepared.

(Examples 2 to 19) and (Comparative Examples 1 to 27)

Curable compositions were prepared according to the formulation ingredients and their amounts shown in Tables 1 to 4 by the same method as in Example 1. The formulation ingredients used are listed below.

Versatic 10: product of Japan Epoxy Resins, compound name: versatic acid

Actcol P-23: product of Mitsui Takeda Chemicals Inc., compound name: polypropylene glycol having molecular weight of 3,000

Hexamoll DINCH: product of BASF, compound name: diisononylcyclohexane dicarboxylate Neostann U-220H: product of Nitto Kasei Co., Ltd., compound name: dibutyltin bisacetylacetonate Irgafos 168: product of Ciba Japan K.K., compound name: tris(2,4-di-t-butylphenyl)phosphite Adekastab PEP-4C: product of ADEKA Corporation, compound name: di(nonylphenyl)pentaerythritol diphosphite Adekastab PEP-8: product of ADEKA Corporation, compound name: distearyl pentaerythritol diphosphite 1-o-Tolylbiguanide: product of Evonik-Degussa, trade name: Dyhard OTB Lithium salt having T-629 structure: compound name: lithium 2,2'-methylenebis(4,6-di-t-butylphenyl)phosphate Lithium salt having T-629 structure+fatty acid salt: compound name: compound mainly containing lithium 2,2'-methylenebis(4,6-di-t-butylphenyl)phosphate Sodium di(p-tolyl)phosphate: reagent produced by Wako Pure Chemical Industries, Ltd.

Disodium phenyl phosphate: reagent produced by Wako Pure Chemical Industries, Ltd.

Calcium di(p-tolyl)phosphate: reagent produced by Wako Pure Chemical Industries, Ltd.

Vinyltriisopropenoxysilane: reagent produced by Gelest Inc.

Trisodium phosphate: reagent produced by Wako Pure Chemical Industries, Ltd.

Tri(2-ethylhexyl)phosphate: product of Daihachi Chemical Industry Co., Ltd., trade name: TOP Adekastab NPO-3: product of ADEKA Corporation, compound name: zinc salt of long-chain alkyl group-containing phosphate ester Tricresyl phosphate: product of Daihachi Chemical Industry Co., Ltd., trade name: TCP Cresyl diphenyl phosphate: product of Daihachi Chemical Industry Co., Ltd., trade name: CDP 2-Ethylhexyl diphenyl phosphate: product of Daihachi Chemical Industry Co., Ltd., trade name: #41

Triphenyl phosphite: product of ADEKA Corporation, trade name: Adekastab TPP

Adekastab HP-10: product of ADEKA Corporation, compound name: 2,2'-methylenebis(4,6-di-butylphenyl)octyl phosphite Sodium p-toluenesulfonate: reagent produced by Wako Pure Chemical Industries, Ltd.

Sodium dodecyl sulfonate: reagent produced by Wako Pure Chemical Industries, Ltd.

Lithium stearate: reagent produced by Wako Pure Chemical Industries, Ltd.

The one-component type moisture-curable compositions prepared in Example 1 and Comparative Examples 1 to 5 were evaluated on the respective properties by the methods mentioned later. Table 1 shows the results.

TABLE 1

| | | Example 1 | Comparative Examples 1 | 2 | 3 | 4 | 5 |
|---|---|---|---|---|---|---|---|
| Silyl group-containing organic polymer | A-1 | 100 | 100 | 100 | 20 | | |
| | A-2 | | | | 80 | 100 | 100 |
| Calcium carbonate | HAKUENKA CCR | 120 | 120 | 120 | 120 | 120 | 120 |
| Plasticizer | DIDP | 45 | 45 | 45 | | 55 | |
| | Actcol P-23 | | | | 55 | | 55 |
| | Dimethyl adipate | 10 | 10 | 10 | | | |
| Pigment | TIPAQUE R-820 | 20 | 20 | 20 | 20 | 20 | 20 |
| Anti-sagging agent | DISPARLON 6500 | 2 | 2 | 2 | 2 | 2 | 2 |
| Ultraviolet absorber | Sumisorb 400 | 1 | 1 | 1 | 1 | 1 | 1 |
| Light stabilizer | SANOL LS770 | 1 | 1 | 1 | 1 | 1 | 1 |
| Phosphorus compound | T-629 | 5 | | | | | |
| Carboxylic acid | Versatic 10 | | 2.55 | | | | |
| Dehydrating agent | A-171 | 2 | 2 | 2 | 2 | 2 | 2 |
| Adhesiveness-imparting agent | A-1122 | 1.5 | 1.5 | 1.5 | 1.5 | 1.5 | 1.5 |
| | A-1110 | 1.5 | 1.5 | 1.5 | 1.5 | 1.5 | 1.5 |
| 1-Phenylguanidine solution (45 wt %) | | 3.3 | 3.3 | 3.3 | 13.3 | | |
| Dibutyltin compound | Neostann U-220H | | | | | 2 | 2 |
| Surface curing time (minutes) | | 25 | 125 | 35 | 25 | 25 | 20 |
| Cured product surface after 7-day storage at 23° C. | Visually observed surface condition | Good | Good | Good | Yellow spots | Good | Good |
| | b value | +1.98 | +3.95 | +3.06 | +7.09 | +2.27 | +1.60 |
| Cured product surface after 1500-hour irradiation with sunshine weather meter | Visually observed surface condition | Good | Crack | Crack | Slightly yellow | Crack | Crack |
| | b value | +4.74 | +6.95 | +6.76 | +9.20 | +4.14 | +4.16 |
| Cured product surface after 10000 MJ/m² irradiation under EMMAQUA NTW | Visually observed surface condition | Good | Slightly yellow | Slightly yellow | Yellow | Good | Good |
| | b value | +6.17 | +12.35 | +8.66 | +45.75 | +5.21 | +4.70 |
| Cured product surface after 10000 MJ/m² irradiation under EMMA | Visually observed surface condition | Slightly yellow | Crack/ yellow | Yellow | Crack/ yellow | Good | Good |
| | b value | +11.09 | +28.57 | +25.36 | +25.35 | +5.08 | +6.28 |

As shown in Example 1, the cured product produced from a curable composition containing an organic polymer having a reactive silyl group, a specific guanidine compound as a silanol condensation catalyst, and the phosphorus compound according to the present invention showed no cracks on the surface thereof and was in a good condition even after a long-term accelerated weathering test. Addition of the phosphorus compound remarkably suppressed yellowing caused by the condensation catalyst. Also, as for the curing rate of the surface, the curable composition has fast curability that is similar to the curability of the curable compositions containing a conventionally used dibutyltin catalyst.

The one-component type moisture-curable compositions prepared in Examples 2 to 6 and Comparative Examples 6 to 11 were evaluated on the respective properties by the methods mentioned later. Table 2 shows the results.

TABLE 2

| | | Examples | | | | | Comparative Examples |
|---|---|---|---|---|---|---|---|
| | | 2 | 3 | 4 | 5 | 6 | 6 |
| Silyl group-containing organic polymer | A-1 | 100 | 100 | 100 | | | 100 |
| | A-3 | | | | 100 | 100 | |
| Calcium carbonate | HAKUENKA CCR | 120 | 120 | 120 | 120 | 120 | 120 |

TABLE 2-continued

| | | | | | | | |
|---|---|---|---|---|---|---|---|
| Plasticizer | DIDP | 45 | 45 | 45 | 45 | 45 | 45 |
| | Dimethyl adipate | 10 | 10 | 10 | 10 | 10 | 10 |
| Pigment | TIPAQUE R-820 | 20 | 20 | 20 | 20 | 20 | 20 |
| Anti-sagging agent | DISPARLON 6500 | 2 | 2 | 2 | 2 | 2 | 2 |
| Ultraviolet absorber | Sumisorb 400 | 1 | 1 | 1 | 1 | 1 | 1 |
| Light stabilizer | SANOL LS770 | 1 | 1 | 1 | 1 | 1 | 1 |
| Phosphorus compound | T-629 (pentavalent phosphorus compound) | 3 | 5 | 10 | 5 | 5 | |
| | Irgafos 168 (trivalent phosphorus compound) | | | | | | |
| | Adekastab PEP-4C (trivalent phosphorus compound) | | | | | | |
| | Adekastab PEP-8 (trivalent phosphorus compound) | | | | | | |
| Dehydrating agent | A-171 | 2 | 2 | 2 | 2 | 2 | 2 |
| Adhesiveness-imparting agent | A-1122 | 1.5 | 1.5 | 1.5 | 1.5 | 1.5 | 1.5 |
| | A-1110 | 1.5 | 1.5 | 1.5 | 1.5 | 1.5 | 1.5 |
| 1-Phenylguanidine solution (45 wt %) | | 4.5 | 4.5 | 4.5 | 3.3 | | 4.5 |
| 1-o-Tolylbiguanide | | | | | | 3 | |
| Surface curing time (minutes) | | 32 | 25 | 18 | 37 | 38 | 35 |
| Tensile properties of cured product | 50% modulus (MPa) | 0.53 | 0.62 | 0.56 | 0.37 | 0.33 | 0.47 |
| | 100% modulus (MPa) | 0.86 | 0.98 | 0.94 | 0.64 | 0.57 | 0.77 |
| | Strength at break (MPa) | 1.78 | 1.78 | 1.88 | 2.15 | 2.80 | 2.12 |
| | Elongation at break (%) | 395 | 355 | 390 | 790 | 910 | 465 |
| Surface condition of cured product | 23° C., 7 days later | Good | Good | Good | Good | Good | Circular patterns |
| | 23° C., 14 days later | Good | Good | Good | Good | Good | Circular patterns |
| | 23° C., 21 days later | Some fine particles | Good | Good | Good | Good | Circular patterns |
| Surface color of cured product | b value of surface after curing at 23° C. for 3 days and at 50° C. for 4 days | +3.5 | +3.7 | +3.7 | +3.5 | +4.0 | +3.8 |
| | b value of surface after 60-hour irradiation with sunshine weather meter | +6.7 | +5.9 | +3.7 | +6.3 | +5.0 | +8.5 |
| | Visually observed surface color after 60-hour irradiation with sunshine weather meter | White | White | White | White | White | Slightly yellow |

| | | Comparative Examples | | | | |
|---|---|---|---|---|---|---|
| | | 7 | 8 | 9 | 10 | 11 |
| Silyl group-containing organic polymer | A-1 | 100 | 100 | 100 | | |
| | A-3 | | | | 100 | 100 |
| Calcium carbonate | HAKUENKA CCR | 120 | 120 | 120 | 120 | 120 |
| Plasticizer | DIDP | 45 | 45 | 45 | 45 | 45 |
| | Dimethyl adipate | 10 | 10 | 10 | 10 | 10 |
| Pigment | TIPAQUE R-820 | 20 | 20 | 20 | 20 | 20 |
| Anti-sagging agent | DISPARLON 6500 | 2 | 2 | 2 | 2 | 2 |
| Ultraviolet absorber | Sumisorb 400 | 1 | 1 | 1 | 1 | 1 |
| Light stabilizer | SANOL LS770 | 1 | 1 | 1 | 1 | 1 |
| Phosphorus compound | T-629 (pentavalent phosphorus compound) | | | | | |
| | Irgafos 168 (trivalent phosphorus compound) | 3 | | | | |
| | Adekastab PEP-4C (trivalent phosphorus compound) | | 5 | | | |
| | Adekastab PEP-8 (trivalent phosphorus compound) | | | 5 | | |
| Dehydrating agent | A-171 | 2 | 2 | 2 | 2 | 2 |
| Adhesiveness-imparting agent | A-1122 | 1.5 | 1.5 | 1.5 | 1.5 | 1.5 |
| | A-1110 | 1.5 | 1.5 | 1.5 | 1.5 | 1.5 |
| 1-Phenylguanidine solution (45 wt %) | | 4.5 | 4.5 | 4.5 | 3.3 | |
| 1-o-Tolylbiguanide | | | | | | 3 |
| Surface curing time (minutes) | | 28 | 30 | Not evaluable because of strong, bad odor | 34 | 43 |
| Tensile properties of cured product | 50% modulus (MPa) | 0.47 | 0.40 | | 0.30 | 0.33 |
| | 100% modulus (MPa) | 0.76 | 0.67 | | 0.51 | 0.58 |
| | Strength at break (MPa) | 1.81 | 1.72 | | 3.35 | 2.59 |
| | Elongation at break (%) | 420 | 465 | | 1015 | 835 |
| Surface condition of cured product | 23° C., 7 days later | Small particles | Small particles | | Good | Good |
| | 23° C., 14 days later | Small particles | Small particles | | Some fine particles | Good |
| | 23° C., 21 days later | Small particles | Small particles | | Some fine particles | Good |

As shown in Table 2, each of the curable compositions containing 1-phenylguanidine in a large amount as a curing catalyst and no phosphorus compound gave a cured product that had circular patterns generated on the surface thereof and therefore had a spoiled appearance. On the other hand, each of the curable compositions containing Irgafos 168 or Adekastab PEP-4C (which are trivalent phosphorus compounds) still had a problem in the surface properties of the cured product such that the cured product had a large number of small particles on the surface thereof instead of circular patterns. The curable composition containing Adekastab PEP-8 (trivalent phosphorus compound) gave off a strong, bad odor when taken out of its airtight container, and thus the respective properties could not be evaluated. In contrast, each of the curable compositions containing T-629 gave off no bad odor, and gave a cured product that was in a good condition even after a long-time storage. The cured products were irradiated with a sunshine weather meter for 60 hours and then evaluated on the surface color thereof. The results showed that the larger the blending amount of T-629 was, the more the yellowing was suppressed. Even in the case that the curable composition contained 1-o-tolylbiguanide as a silanol condensation catalyst, addition of T-629 suppressed yellowing on the surface of the cured product after the weathering test without deteriorating the curability of the curable composition and the mechanical properties of the cured product.

The one-component type moisture-curable compositions prepared in Examples 7 to 19 were evaluated on the respective properties shown in Table 3. Table 3 shows the results.

TABLE 2-continued

| Surface color of cured product | b value of surface after curing at 23° C. for 3 days and at 50° C. for 4 days | +4.0 | +3.5 | | +4.6 | +2.9 |
| | b value of surface after 60-hour irradiation with sunshine weather meter | +9.1 | +4.9 | | +8.6 | +7.8 |
| | Visually observed surface color after 60-hour irradiation with sunshine weather meter | Slightly yellow | White | | Slightly yellow | Slightly yellow |

TABLE 3

| | | Examples | | | | | | |
| --- | --- | --- | --- | --- | --- | --- | --- | --- |
| | | 7 | 8 | 9 | 10 | 11 | 12 | 13 |
| Silyl group-containing organic polymer | A-3 | 100 | 100 | 100 | 100 | 100 | 100 | 100 |
| | A-4 | | | | | | | |
| | A-5 | | | | | | | |
| Calcium carbonate | HAKUENKA CCR | 120 | 120 | 120 | 120 | 120 | 120 | 120 |
| Plasticizer | DIDP | 45 | 45 | 45 | 45 | 45 | 45 | 45 |
| | Dimethyl adipate | 10 | 10 | 10 | 10 | 10 | 10 | 10 |
| | PPG3000 | | | | | | | |
| | Hexamoll DINCH | | | | | | | |
| Pigment | TIPAQUE R-820 | 20 | 20 | 20 | 20 | 20 | 20 | 20 |
| Anti-sagging agent | DISPARLON 6500 | 2 | 2 | 2 | 2 | 2 | 2 | 2 |
| Ultraviolet absorber | Sumisorb 400 | 1 | 1 | 1 | 1 | 1 | 1 | 1 |
| Light stabilizer | SANOL LS770 | 1 | 1 | 1 | 1 | 1 | 1 | 1 |
| Phosphorus compound having aryl group, phosphorus atom with oxidation number of +5, and melting point of 23° C. or higher | T-629 | 5 | 5 | | | | | |
| | Lithium salt having T-629 structure | | | 5.8 | | | | |
| | Lithium salt having T-629 structure + fatty acid salt | | | | 5.8 | | | |
| | Sodium di(p-tolyl) phosphate | | | | | 5 | | |
| | Disodium phenyl phosphate | | | | | | 5 | |
| | Calcium di(p-tolyl) | | | | | | | 5 |
| Dehydrating agent | A-171 Vinyltriisopropenoxysilane | 2 | 2 | 2 | 2 | 2 | 2 | 2 |
| Adhesiveness-imparting agent | A-1122 | 1.5 | 1.5 | 1.5 | 1.5 | 1.5 | 1.5 | 1.5 |
| | A-1110 | 1.5 | 1.5 | 1.5 | 1.5 | 1.5 | 1.5 | 1.5 |
| 1-Phenylguanidine solution (45 wt %) | | 3.3 | | 3.3 | 3.3 | 4.5 | 4.5 | 4.5 |
| 1-o-Tolylbiguanide | | | 3 | | | | | |
| Surface curing time (minutes) | | 37 | 38 | 45 | 25 | 33 | 55 | 37 |
| Tensile properties of cured product | 50% modulus (MPa) | 0.37 | 0.33 | 0.37 | 0.36 | 0.27 | 0.40 | 0.33 |
| | 100% modulus (MPa) | 0.64 | 0.57 | 0.66 | 0.62 | 0.45 | 0.63 | 0.58 |
| | Strength at break (MPa) | 2.15 | 2.80 | 1.86 | 1.95 | 3.33 | 2.23 | 2.95 |
| | Elongation at break (%) | 790 | 910 | 745 | 780 | 1040 | 795 | 950 |
| Surface condition of cured product after 28-day storage at 23° C. and 50% RH | | Good | Good | Good | Good | Good | Good | Good |
| Surface color of cured product after 260-hour irradiation with super xenon weather meter | | White | White | White | White | White | White | White |

| | | | Examples | | | | |
| --- | --- | --- | --- | --- | --- | --- | --- |
| | | | 14 | 15 | 16 | 17 | 18 | 19 |
| Silyl group-containing organic polymer | A-3 | | | | 100 | 100 | 100 | |
| | A-4 | | 100 | 100 | | | | |
| | A-5 | | | | | | | 100 |

TABLE 3-continued

| | | | | | | | |
|---|---|---|---|---|---|---|---|
| Calcium carbonate | HAKUENKA CCR | 120 | 120 | 120 | 120 | 120 | 120 |
| Plasticizer | DIDP | 45 | 45 | 55 | | | 55 |
| | Dimethyl adipate | 10 | 10 | | | | |
| | PPG3000 | | | | 55 | | |
| | Hexamoll DINCH | | | | | 55 | |
| Pigment | TIPAQUE R-820 | 20 | 20 | 20 | 20 | 20 | 20 |
| Anti-sagging agent | DISPARLON 6500 | 2 | 2 | 2 | 2 | 2 | 2 |
| Ultraviolet absorber | Sumisorb 400 | 1 | 1 | 1 | 1 | 1 | 1 |
| Light stabilizer | SANOL LS770 | 1 | 1 | 1 | 1 | 1 | 1 |
| Phosphorus compound having aryl group, phosphorus atom with oxidation number of +5, and melting point of 23° C. or higher | T-629 | 5 | 5 | 5 | 5 | 5 | 5 |
| | Lithium salt having T-629 structure | | | | | | |
| | Lithium salt having T-629 structure + fatty acid salt | | | | | | |
| | Sodium di(p-tolyl) phosphate | | | | | | |
| | Disodium phenyl phosphate | | | | | | |
| | Calcium di(p-tolyl) | | | | | | |
| Dehydrating agent | A-171 | 2 | 2 | 2 | 2 | 2 | |
| | Vinyltriisopropenoxysilane | | | | | | 3.1 |
| Adhesiveness-imparting agent | A-1122 | 1.5 | 1.5 | 1.5 | 1.5 | 1.5 | 1.5 |
| | A-1110 | 1.5 | 1.5 | 1.5 | 1.5 | 1.5 | 1.5 |
| 1-Phenylguanidine solution (45 wt %) | | 3.3 | | 2.8 | 2.8 | 2.8 | 3.3 |
| 1-o-Tolylbiguanide | | | 3 | | | | |
| Surface curing time (minutes) | | 15 | 22 | 47 | 60 | 50 | 10 |
| Tensile properties of cured product | 50% modulus (MPa) | 0.62 | 0.61 | 0.42 | 0.33 | 0.36 | 0.17 |
| | 100% modulus (MPa) | 0.99 | 0.89 | 0.72 | 0.57 | 0.63 | 0.40 |
| | Strength at break (MPa) | 2.30 | 2.63 | 1.70 | 1.72 | 1.59 | 0.79 |
| | Elongation at break (%) | 550 | 700 | 560 | 645 | 635 | 300 |
| Surface condition of cured product after 28-day storage at 23° C. and 50% RH | | Good | Good | Good | Good | Good | Good |
| Surface color of cured product after 260-hour irradiation with super xenon weather meter | | White | White | White | White | White | White |

As shown in Table 3, the curable compositions each containing any one of the six phosphorus compounds having an aryl group, a phosphorus atom with an oxidation number of +5, and a melting point of 23° C. or higher were tested for evaluation. All the cured products of these curable compositions had a surface in a good condition after 28 days of storage. Further, all the sheet-shaped cured products were white and remained in a good initial condition even after irradiated with a super xenon weather meter for 260 hours. A phthalate ester plasticizer, a polypropylene glycol plasticizer, and a diisononylcyclohexane dicarboxylate plasticizer were evaluated on their effects on the curable compositions, and the Table shows that all these plasticizers are usable without problems. Example 19 employed a triisopropenoxysilyl-terminated organic polymer, and the results show that, in the case that 1-phenylguanidine was used as a curing catalyst with this organic polymer, the curing rate of the surface of the curable composition was high and addition of the specific phosphorus compound led to a cured product with a good surface condition and good color.

The one-component type moisture-curable compositions prepared in Comparative Examples 12 to 27 were evaluated on the respective properties shown in Table 4. Table 4 shows the results.

TABLE 4

| | | Comparative Examples | | | | | | | | |
|---|---|---|---|---|---|---|---|---|---|---|
| | | 12 | 13 | 14 | 15 | 16 | 17 | 18 | 19 | 20 |
| Silyl group-containing organic polymer | A-3 | 100 | 100 | 100 | 100 | 100 | 100 | 100 | 100 | 100 |
| | A-4 | | | | | | | | | |
| | A-5 | | | | | | | | | |
| Calcium carbonate | HAKUENKA CCR | 120 | 120 | 120 | 120 | 120 | 120 | 120 | 120 | 120 |
| Plasticizer | DIDP | 45 | 45 | 45 | 45 | 45 | 45 | 45 | 45 | 45 |
| | Dimethyl adipate | 10 | 10 | 10 | 10 | 10 | 10 | 10 | 10 | 10 |
| Pigment | TIPAQUE R-820 | 20 | 20 | 20 | 20 | 20 | 20 | 20 | 20 | 20 |
| Anti-sagging agent | DISPARLON 6500 | 2 | 2 | 2 | 2 | 2 | 2 | 2 | 2 | 2 |
| Ultraviolet absorber | Sumisorb 400 | 1 | 1 | 1 | 1 | 1 | 1 | 1 | 1 | 1 |
| Light stabilizer | SANOL LS770 | 1 | 1 | 1 | 1 | 1 | 1 | 1 | 1 | 1 |
| Phosphorus compound having no aryl group | Trisodium phosphate | | | 5 | | | | | | |
| | Tri(2-ethylhexyl) phosphate | | | | 5 | | | | | |
| | Adekastab NPO-3 | | | | | 5 | | | | |
| Phosphorus compound having aryl group and melting point of lower than 23° C. | Tricresyl phosphate | | | | | | 5 | | | |
| | Cresyl diphenyl phosphate | | | | | | | 5 | | |
| | 2-ethylhexyl diphenyl phosphate | | | | | | | | 5 | |
| | Triphenyl phosphite | | | | | | | | | 5 |
| Trivalent phosphorus compound having aryl group and melting point of 23° C. or higher | Adekastab HP-10 | | | | | | | | | |
| | Irgafos168 | | | | | | | | | |

TABLE 4-continued

| | | | | | | | | | | |
|---|---|---|---|---|---|---|---|---|---|---|
| Metal salt of sulfur compound | Sodium p-toluenesulfonate | | | | | | | | | |
| | Sodium dodecyl sulfonate | | | | | | | | | |
| Metal salt of carboxylic acid | Lithium stearate | | | | | | | | | |
| Dehydrating agent | A-171 | 2 | 2 | 2 | 2 | 2 | 2 | 2 | 2 | 2 |
| | Vinyltriisopropenoxysilane | | | | | | | | | |
| Adhesiveness-imparting | A-1122 | 1.5 | 1.5 | 1.5 | 1.5 | 1.5 | 1.5 | 1.5 | 1.5 | 1.5 |
| agent | A-1110 | 1.5 | 1.5 | 1.5 | 1.5 | 1.5 | 1.5 | 1.5 | 1.5 | 1.5 |
| 1-Phenylguanidine solution (45 wt %) | | 3.3 | | 3.3 | 3.3 | 3.3 | 3.3 | 3.3 | 3.3 | 3.3 |
| 1-o-Tolylbiguanide | | | 3 | | | | | | | |
| Surface curing time (minutes) | | 37 | 30 | | | 130 | | | | |
| Tensile properties of cured | 50% modulus (MPa) | 0.41 | 0.36 | | | 0.47 | | | | |
| product | 100% modulus (MPa) | 0.69 | 0.66 | | | 0.74 | | | | |
| | Strength at break (MPa) | 1.92 | 1.63 | | | 2.35 | | | | |
| | Elongation at break (%) | 675 | 450 | | | 595 | | | | |
| Surface condition of cured product after 28-day storage at 23° C. and 50% RH | | Circular pattern | Good | Circular pattern | Circular pattern | Circular pattern | Circular pattern | Circular pattern | Circular pattern | Circular pattern |
| Surface color of cured product after 260-hour irradiation with super xenon weather meter | | Yellow | Slightly yellow | Yellow | Yellow | Yellow | Yellow | Yellow | Yellow | Yellow |
| Others | | N/A | N/A | N/A | N/A | N/A | N/A | N/A | N/A | N/A |

| | | Comparative Examples | | | | | | |
|---|---|---|---|---|---|---|---|---|
| | | 21 | 22 | 23 | 24 | 25 | 26 | 27 |
| Silyl group-containing organic polymer | A-3 | 100 | 100 | 100 | 100 | 100 | | |
| | A-4 | | | | | | 100 | |
| | A-5 | | | | | | | 100 |
| Calcium carbonate | HAKUENKA CCR | 120 | 120 | 120 | 120 | 120 | 120 | 120 |
| Plasticizer | DIDP | 45 | 45 | 45 | 45 | 45 | 45 | 55 |
| | Dimethyl adipate | 10 | 10 | 10 | 10 | 10 | 10 | |
| Pigment | TIPAQUE R-820 | 20 | 20 | 20 | 20 | 20 | 20 | 20 |
| Anti-sagging agent | DISPARLON 6500 | 2 | 2 | 2 | 2 | 2 | 2 | 2 |
| Ultraviolet absorber | Sumisorb 400 | 1 | 1 | 1 | 1 | 1 | 1 | 1 |
| Light stabilizer | SANOL LS770 | 1 | 1 | 1 | 1 | 1 | 1 | 1 |
| Phosphorus compound having no aryl group | Trisodium phosphate | | | | | | | |
| | Tri(2-ethylhexyl) phosphate | | | | | | | |
| | Adekastab NPO-3 | | | | | | | |
| Phosphorus compound having aryl group and melting point of lower than 23° C. | Tricresyl phosphate | | | | | | | |
| | Cresyl diphenyl phosphate | | | | | | | |
| | 2-ethylhexyl diphenyl phosphate | | | | | | | |
| | Triphenyl phosphite | | | | | | | |
| Trivalent phosphorus compound having aryl group and melting point of 23° C. or higher | Adekastab HP-10 | 6.88 | | | | | | |
| | Irgafos168 | | 3 | | | | | |
| Metal salt of sulfur compound | Sodium p-toluenesulfonate | | | 2 | | | | |
| | Sodium dodecyl sulfonate | | | | 2 | | | |
| Metal salt of carboxylic acid | Lithium stearate | | | | | 3.4 | | |
| Dehydrating agent | A-171 | 2 | 2 | 2 | 2 | 2 | 2 | |
| | Vinyltriisopropenoxysilane | | | | | | | 3.1 |
| Adhesiveness-imparting | A-1122 | 1.5 | 1.5 | 1.5 | 1.5 | 1.5 | 1.5 | 1.5 |
| agent | A-1110 | 1.5 | 1.5 | 1.5 | 1.5 | 1.5 | 1.5 | 1.5 |
| 1-Phenylguanidine solution (45 wt %) | | 3.3 | 4.4 | 3.3 | 3.3 | 3.3 | 1.6 | 3.3 |
| 1-o-Tolylbiguanide | | | | | | | | |
| Surface curing time (minutes) | | 41 | 50 | | | 40 | 40 | 12 |
| Tensile properties of cured | 50% modulus (MPa) | 0.30 | 0.46 | | | 0.29 | 0.67 | 0.16 |
| product | 100% modulus (MPa) | 0.50 | 0.72 | | | 0.49 | 1.01 | 0.38 |
| | Strength at break (MPa) | 2.42 | 1.73 | | | 2.23 | 2.25 | 0.76 |
| | Elongation at break (%) | 850 | 630 | | | 860 | 420 | 315 |
| Surface condition of cured product after 28-day storage at 23° C. and 50% RH | | Circular pattern | Small particles | Good | Good | Circular pattern | Good | Circular pattern |
| Surface color of cured product after 260-hour irradiation with super xenon weather meter | | Yellow | Yellow | Yellow | Slightly yellow | Yellow | Slightly yellow | Yellow |
| Others | | N/A | Bad odor | N/A | N/A | N/A | N/A | N/A |

As seen in Comparative Example 12 and Comparative Example 13, each of the compositions containing no phosphorus compound gave a cured product that had yellowing on the surface thereof after the accelerated weathering test. In the case of the curable compositions containing 1-phenylguanidine as a catalyst, their cured products had many circular patterns on the surface thereof after 28 days of storage, and therefore had a spoiled appearance. A phosphorus compound having no aryl group or a phosphorus compound having an aryl group but having a melting point of lower than 23° C. was used in some Comparative Examples, and all the cured products in these Comparative Examples were yellowed on the surface after the weathering test, and were not able to solve the problem of occurrence of circular patterns due to phenylguanidine. A phosphorus compound having an aryl group, a melting point of 23° C. or higher, and a phosphorus atom with an oxidation number of +3 was also used and evaluated, and all the cured products with such a phosphorus compound were yellowed and had a bad surface condition.

In the case that the curable composition contained an analogous compound having a sulfur atom instead, the surface condition of the cured product after 28 days of storage was improved but the surface of the cured product after the weathering test was yellowed.

FIG. 1 is a graph showing the results of measuring changes over time in yellowness of the surfaces of the cured products produced in Example 7, Example 8, Comparative Example 12, and Comparative Example 13, with a super xenon weather meter. The results show that the curable compositions containing no phosphorus compound had yellowing on the surface of the cured products with time, while the curable compositions containing the phosphorus compound according to the present invention had less discoloration and maintained the same level as the original white color for a long time.

(Surface Curing Time)

Each of the curable compositions was spread to a thickness of about 3 mm with a spatula at 23° C. and 50% RH. The surface of the curable composition was gently touched with a microspatula from time to time, and the time required for the composition to no longer stick to the microspatula was determined.

(Surface Condition of Cured Product)

Each of the curable compositions was filled into a mold having a thickness of about 3 mm at a constant temperature of 23° C. and a constant humidity of 50% RH, and the surface of the composition was smoothed out. The cured product produced therefrom was left under the same conditions, and the surface condition of the cured product was visually observed at intervals of a constant period. The surface condition was evaluated as good if it remained the same as the initial surface condition; otherwise, the surface condition at the time of observation was described.

(Coloration on Surface of Cured Product)

Each of the cured products was measured for the color difference with a colorimeter (model number CR-300) produced by Minolta Camera Co., Ltd., in accordance with JIS K 5600-4-5. After white calibration, the color difference on the surface of the cured product was measured in the color space mode of $\Delta(L*a*B*)$. A larger b value shows higher yellowness.

(Accelerated Weathering Test with Sunshine Weather Meter)

A cured product having a thickness of about 3 mm was produced by the same method as the above method, and was cured for three days at 23° C. and 50% RH and for four days at 50° C. Thereafter, the cured product was put in a sunshine carbon arc lamp accelerated weather meter (accelerated weathering instrument produced by Suga Test Instruments Co., Ltd., model number S80). A weathering test was performed under the conditions of a black panel temperature of 63° C., a temperature of 83° C., a humidity of 50%, and a water spray time of 18 minutes out of 120 minutes, and then the surface condition after a given time was visually observed. The surface condition was evaluated as good if the condition remained the same as the initial surface condition; while the surface condition was described as "crack" if the product had any crack (fracture or flaw) on the surface thereof. Also, if the cured product was discolored, the color was described.

(Outdoor Accelerated Weathering Test)

Each of the curable compositions was filled into a mold having a size of 130 mm (length)×30 mm (width)×10 mm (thickness) at 23° C. and 50% RH, and the surface of the composition was smoothed out with a spatula. Two specimens were prepared for each curable composition, and were cured for ten days under the same conditions. After that, the cured specimens were sent to Atlas Weathering Services Group in Arizona, U.S.A., for the outdoor accelerated weathering test in accordance with ISO 877. In this test, an apparatus is used which has 10 flat mirrors in a Fresnel arrangement, and those reflecting concentrator mirrors track the sun while uniformly focusing sunlight onto the test specimen mounted on the target board. The apparatus concentrates sunlight via those highly reflective, specially coated mirrors onto the test specimen, with an intensity of approximately eight times the sunlight in terms of the whole wavelength range and at an intensity of approximately five times the sunlight in terms of the ultraviolet range, maintaining the same wavelength distribution as sunlight. The following two different methods were employed in the accelerated weathering test performed in Arizona, U.S.A.

(1) EMMAQUA NTW: Method of spraying the test specimen with deionized water for three minutes at intervals of 15 minutes, only at night.

(2) EMMA: Method of spaying no water.

In each method, the exposure was terminated when the amount of light in the whole wavelength range reached 10,000 MJ/m$^2$, and the changes in the surface condition of the cured product before and after the accelerated weathering test were evaluated.

(Tensile Properties of Cured Product)

Each of the curable compositions was formed into a 3-mm-thick sheet-shaped sample. The sample was left at 23° C. and 50% RH for three days and was then cured at 50° C. for four days. The cured sample was then punched out into a shape of the dumbbell No. 3, and was subjected to tensile testing using Autograph produced by Shimadzu Corporation at a rate of pull of 200 mm/min to measure the 100% tensile modulus, strength at break, and elongation at break of the composition.

(Odor of Curable Composition)

About 50 g of each of the curable compositions was taken out, and was tested for bad odor.

(Super Xenon Weather Meter)

A 3-mm-thick sheet-shaped sample was produced by the same method as the above method, and was cured at 23° C. and 50% RH for three days and then at 50° C. for four days. The sample was then put in a super xenon weather meter (accelerated weathering instrument produced by Suga Test Instruments Co., Ltd., model number SX75). The sample was exposed to a 7.5-kW water-cooled xenon arc lamp for 260 hours under the conditions of an irradiance of 150 W/m$^2$, a black panel temperature of 83° C., and a humidity of 50%. Then, the surface color of the cured product was visually observed. After a given time elapsed, the surface color was measured with the above-mentioned colorimeter, and a YI value was calculated. The YI value shows the yellowness, and a larger value indicates higher yellowness.

Industrial Applicability

The curable composition of the present invention may be suitably used in applications such as pressure-sensitive adhesives; sealants for uses such as buildings, ships, automobiles, and roads; adhesives; impression materials; vibration-proof materials; damping materials; soundproof materials; expanded/foamed materials; coating compositions; and spray coatings. The curable composition is more preferably used in such applications as sealants and adhesives.

The curable composition of the present invention may also be used in various applications such as electric and electronic part materials; elastic adhesives; contact adhesives; spray sealants; crack repair materials; tiling adhesives; powder coating compositions; casting materials; rubber materials for medical use; pressure-sensitive adhesives for medical use; sealants for medical devices; food packaging materials; joint sealants for siding boards and other exterior materials; coating materials; primers; electromagnetic-wave-shielding conductive materials and thermally conductive materials; hot melt materials; potting agents for electrics and electronics;

films; gaskets; various molding materials; rustproof and waterproof sealants for wired glass and laminated-glass edges; and liquid sealants for use in automotive parts, electrical machinery parts, various machinery parts, and the like.

Further, the curable composition may also be used as various sealing compositions and adhesive compositions because it, either alone or with the aid of a primer, may adhere to a wide range of substrates such as glass, ceramics, wood, metals, and molded resin products.

The curable composition of the present invention may also be used as panel adhesives, tiling adhesives, stone pitching adhesives, ceiling finishing adhesives, floor finishing adhesives, wall finishing adhesives, vehicle panel adhesives, direct glazing sealants, double glazing sealants, sealants for SSG systems, and working joint sealants for buildings.

The invention claimed is:

1. A curable composition comprising:
   (A) an organic polymer having a silyl group cross-linkable by siloxane bond formation and, as a main chain skeleton, a polyoxyalkylene polymer;
   (B) a guanidine compound as a silanol condensation catalyst, represented by formula (1):

wherein each of the five $R^1$s is independently at least one selected from the group consisting of a hydrogen atom, a hydroxy group, an amino group, a nitro group, a cyano group, a sulfonic acid group, and an organic group, provided that at least one of the five $R^1$s is an aryl group; and
   (C) a phosphorus compound that has an aryl group, has a phosphorus atom with an oxidation number of +5, and has a melting point of 23° C. or higher.

2. The curable composition according to claim 1, wherein the phosphorus compound (C) is a phosphate ester compound.

3. The curable composition according to claim 1, wherein the phosphorus compound (C) is a metal salt of a phosphate ester.

4. The curable composition according to claim 1, wherein a blending amount of the phosphorus compound (C) is 2 to 20 parts by weight for each 100 parts by weight of the organic polymer (A).

5. The curable composition according to claim 1, wherein the guanidine compound (B) is represented by formula (2):

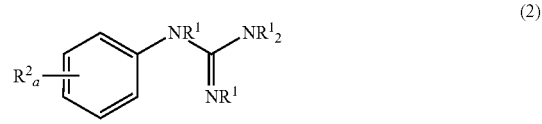

wherein each of the four $R^1$s is independently at least one selected from the group consisting of a hydrogen atom, a hydroxy group, an amino group, a nitro group, a cyano group, a sulfonic acid group, and an organic group; each of the a $R^2$s is at least one selected from the group consisting of a hydrogen atom, a halogen atom, a hydroxy group, an amino group, a nitro group, a cyano group, a sulfonic acid group, and an organic group; and a is an integer of 1 to 5.

6. The curable composition according to claim 1, wherein the guanidine compound (B) is at least one selected from the group consisting of 1-phenylguanidine, 1-(o-tolyl)guanidine, 1-phenylbiguanide, and 1-(o-tolyl) biguanide.

7. The curable composition according to claim 1, wherein the polyoxyalkylene polymer is a polyoxypropylene polymer.

8. A sealant, comprising the curable composition according to claim 1.

9. An adhesive, comprising the curable composition according to claim 1.

10. A cured product, which is produced from the curable composition according to claim 1.

* * * * *